United States Patent
Kim et al.

(10) Patent No.: US 10,791,163 B2
(45) Date of Patent: Sep. 29, 2020

(54) COMMUNICATION APPARATUS, METHOD, AND SYSTEM FOR USING MULTIMEDIA SERVICE

(71) Applicant: Samsung Electronics Co., Ltd., Gyeonggi-do (KR)

(72) Inventors: Dohyung Kim, Gyeonggi-do (KR); Young-Ky Kim, Seoul (KR); Jae-Duck Lee, Seoul (KR); Ki-Ho Cho, Gyeonggi-do (KR); Ye-Sul Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 661 days.

(21) Appl. No.: 14/600,429

(22) Filed: Jan. 20, 2015

(65) Prior Publication Data

US 2015/0207847 A1    Jul. 23, 2015

(30) Foreign Application Priority Data

Jan. 20, 2014    (KR) ........................ 10-2014-0006817

(51) Int. Cl.
*H04L 29/08*    (2006.01)
*H04L 29/06*    (2006.01)

(52) U.S. Cl.
CPC .......... *H04L 67/02* (2013.01); *H04L 65/1016* (2013.01); *H04L 65/1069* (2013.01); *H04L 65/1083* (2013.01); *H04L 65/1096* (2013.01); *H04L 65/403* (2013.01); *H04L 65/4023* (2013.01); *H04L 67/04* (2013.01); *H04L 67/10* (2013.01); *H04L 67/306* (2013.01); *H04L 67/42* (2013.01)

(58) Field of Classification Search
CPC . H04L 65/1069; H04L 65/1083; H04L 67/02; H04L 65/403
USPC ........................................................ 709/204
See application file for complete search history.

(56) References Cited

U.S. PATENT DOCUMENTS

| | | | |
|---|---|---|---|
| 5,884,032 A | 3/1999 | Bateman et al. | |
| 7,646,761 B2 | 1/2010 | Taylor et al. | |
| 8,036,355 B2 | 10/2011 | Velarde et al. | |
| 8,804,930 B1 * | 8/2014 | Brown | H04W 4/16 |
| | | | 379/114.13 |

(Continued)

FOREIGN PATENT DOCUMENTS

CN    101918940 A    12/2010

OTHER PUBLICATIONS

Trickey, G.; "Welcome to the Rich Communications Ecosystem Asia Summit"; Hong Kong; Nov. 14, 2011; 42 pages.

(Continued)

*Primary Examiner* — Chris Parry
*Assistant Examiner* — Adam A Cooney

(57) ABSTRACT

An apparatus and a method to support visible and audible communications using various multimedia services are provided. A method to provide communications using a multimedia service in a server of a communication system is provided. The method includes receiving a voice call connection request for a second device from a first device. The method also includes providing the first device with visual multimedia information generated in advance, over a web network in relation to the second device. The method further includes connecting a voice call between the first device and the second device.

13 Claims, 38 Drawing Sheets

(56) References Cited

U.S. PATENT DOCUMENTS

| | | |
|---|---|---|
| 2002/0172338 A1 | 11/2002 | Lee et al. |
| 2004/0062230 A1 | 4/2004 | Taylor et al. |
| 2006/0193448 A1 | 8/2006 | Donoghue et al. |
| 2010/0073453 A1 | 3/2010 | Velarde et al. |
| 2010/0241664 A1 | 9/2010 | LeVasseur et al. |
| 2011/0117941 A1* | 5/2011 | Zhang .................... H04W 8/24 455/466 |
| 2011/0150433 A1* | 6/2011 | Alexandrov ............ H04N 5/91 386/328 |
| 2012/0315882 A1* | 12/2012 | Chang ............... H04M 1/72522 455/414.1 |
| 2013/0035054 A1 | 2/2013 | Ashton |
| 2013/0097123 A1* | 4/2013 | McColgan ........ G06F 17/30867 707/690 |
| 2013/0195258 A1* | 8/2013 | Atef ........................ H04L 67/34 379/88.01 |
| 2013/0223434 A1 | 8/2013 | Bateman et al. |
| 2015/0149543 A1* | 5/2015 | Kim .................... H04L 65/4015 709/204 |

OTHER PUBLICATIONS

International Search Report dated Apr. 24, 2015 in connection with International Application No. PCT/KR2015/000609; 3 pages.
Written Opinion of International Searching Authority dated Apr. 24, 2015 in connection with International Application No. PCT/KR2015/000609; 7 pages.
China National Intellectual Property Administration, "The First Office Action," Application No. CN 201580005088.9, dated Nov. 5, 2018, 18 pages.
Notice of Preliminary Rejection in connection with Korean Application No. 10-2014-0006817 dated Dec. 9, 2019, 12 pages.
Notice of Patent Grant dated Apr. 29, 2020 in connection with Korean Patent Application No. 10-2014-0006817, 4 pages.

* cited by examiner

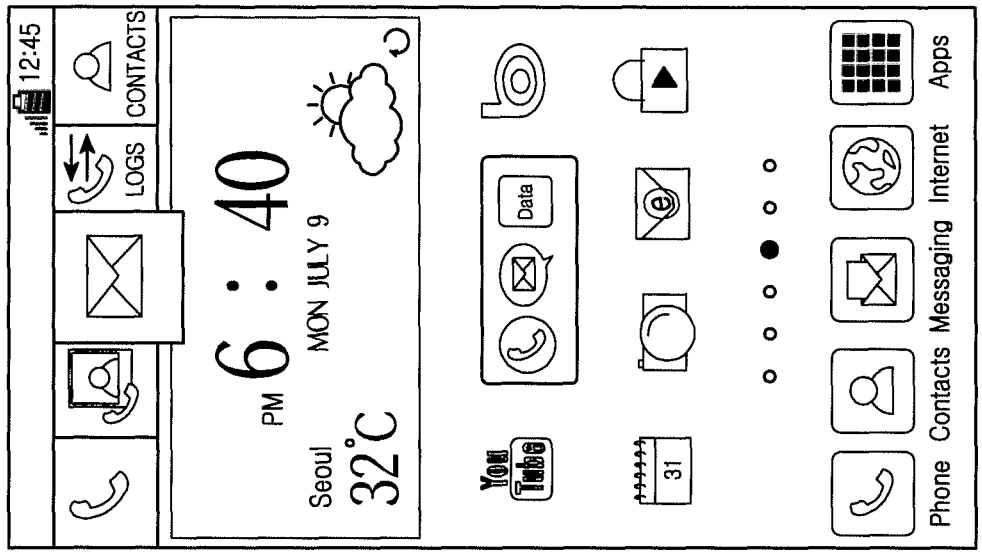
<FIG.6B> <MINIMIZED MODE>
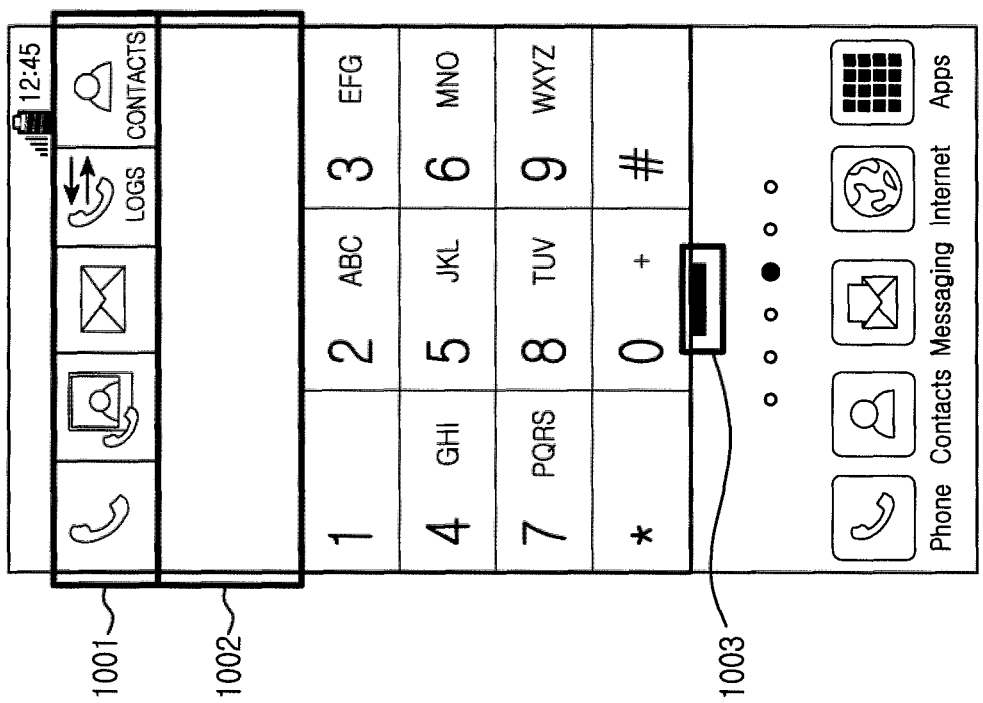
<FIG.6A> <BASIC ACTIVE MODE>

DISPLAY AND SELECT SNS LINK ICONS
(e.g., TWITTER)

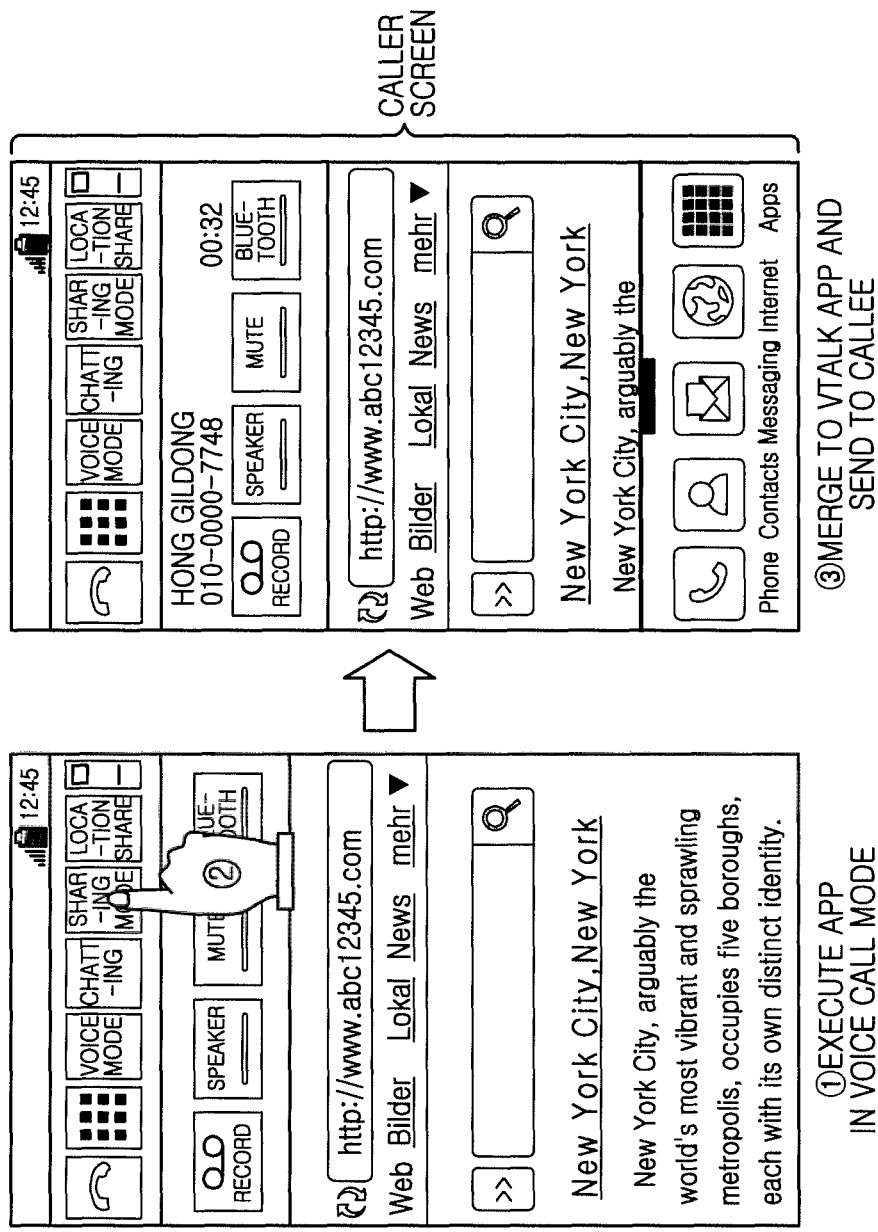

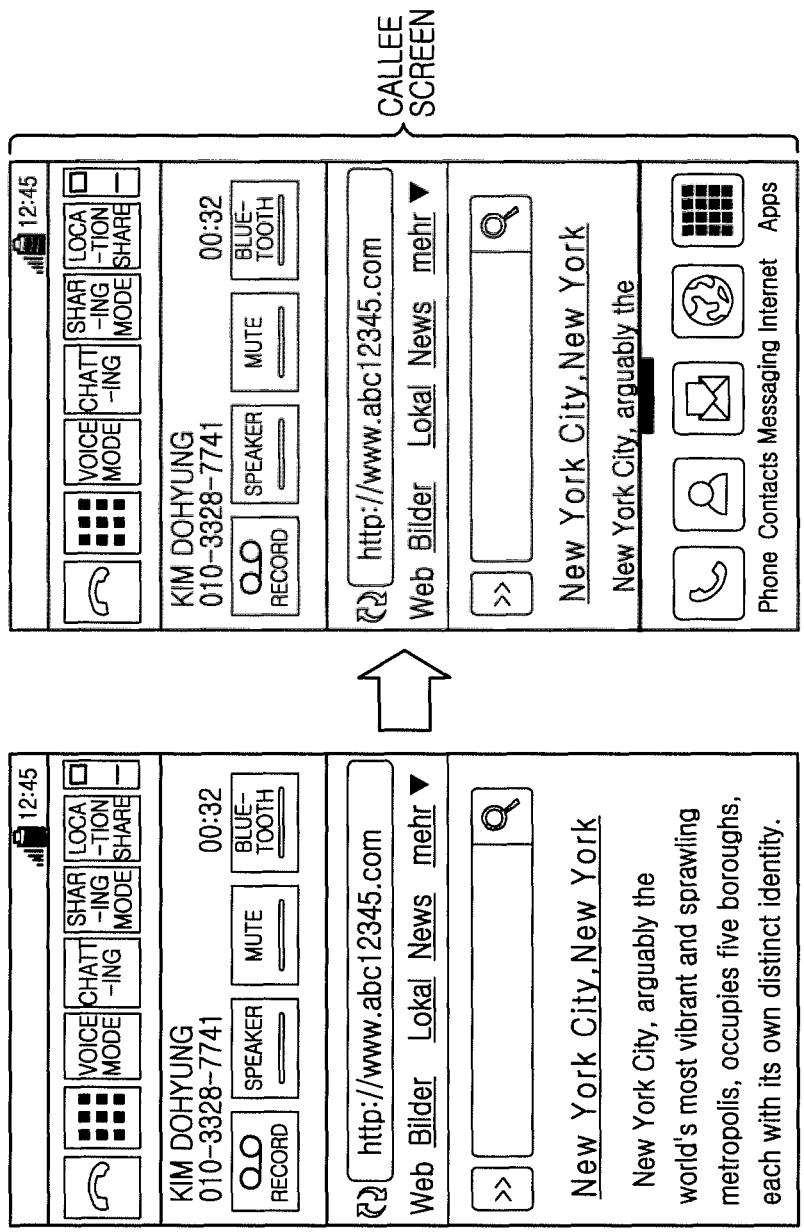

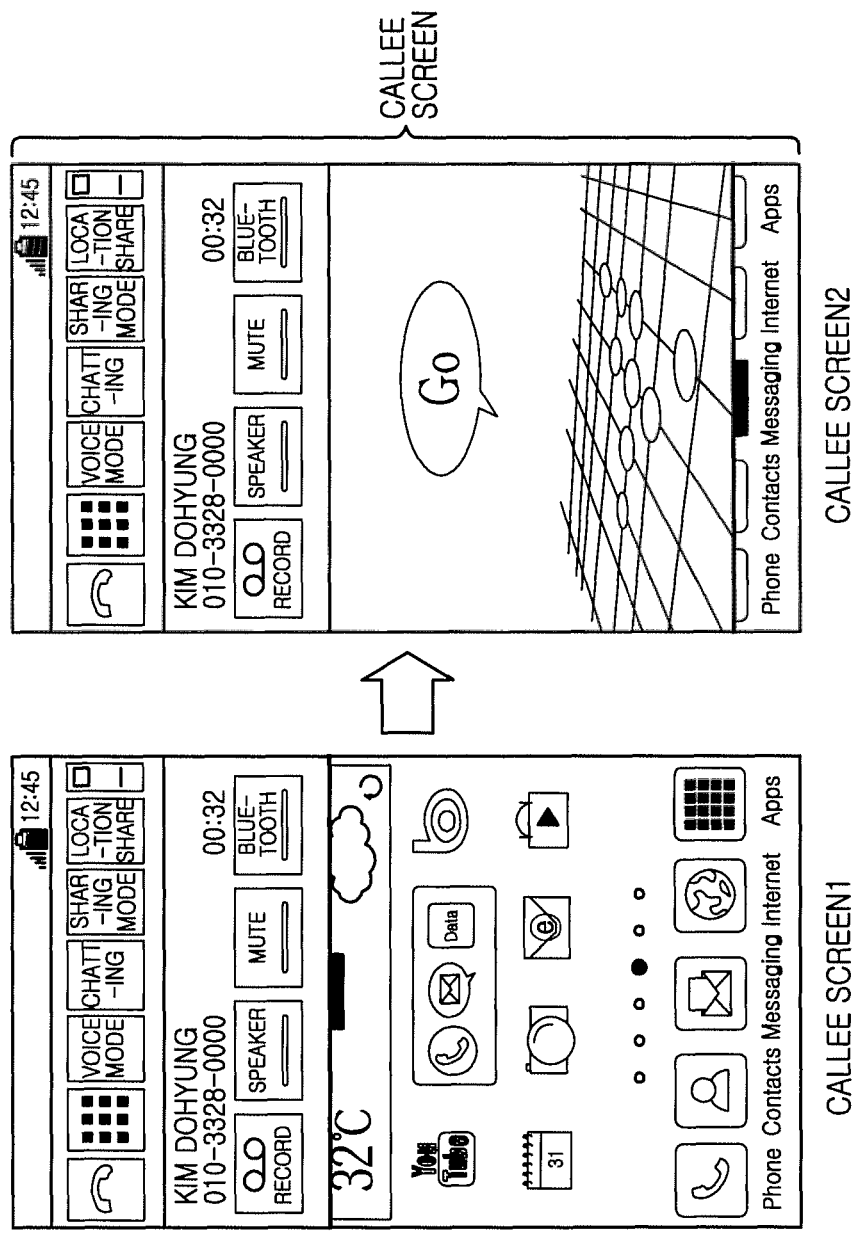

COMMUNICATION APPARATUS, METHOD, AND SYSTEM FOR USING MULTIMEDIA SERVICE

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Jan. 20, 2014, and assigned Serial No. 10-2014-0006817, the entire disclosure of which is hereby incorporated by reference.

TECHNICAL FIELD

The present disclosure relates generally to communications using a multimedia service.

BACKGROUND

Recently, beyond voice-oriented communications, communications using various multimedia services are under consideration. For example, techniques such as Rich Communication Suite (RCS) of Global System for Mobile Communications Association (GSMA) and Web Real-Time Communication (WebRTC) of World Wide Web Consortium (W3C) utilize richer services than before and converge web technologies with a traditional voice communication infrastructure in a call.

SUMMARY

To address the above-discussed deficiencies of the prior art, it is a primary aspect of the present disclosure to provide an apparatus and a method for supporting visible and audible communications using various multimedia services.

Another aspect of the present disclosure is to provide an apparatus and a method for providing a basic framework and an optimized user interface for communications using various multimedia services.

Yet another aspect of the present disclosure is to provide an apparatus and a method for exchanging a profile and a sharing a data service between a caller and a callee during a call attempt or a call.

In a first example, a method for providing communications using a multimedia service in a server of a communication system is provided. The method includes receiving a voice call connection request for a second device from a first device. The method also includes providing the first device with visual multimedia information generated in advance, over a web network in relation to the second device. The method further includes connecting a voice call between the first device and the second device.

In a second example, a communication method of a caller device in a communication system is provided. The method includes requesting voice call connection from a callee device. The method also includes receiving pre-generated visual multimedia information from a server over a web network in relation to the callee device. The method further includes communicating with the callee device.

In a third example, a communication method of a caller device in a communication system is provided. The method includes performing voice communications with a callee device. The method also includes executing at least one of an application and a web browser during the call. The method further includes sharing at least one of the application and a webpage content executed by the web browser with the callee device.

In a fourth example, an apparatus of a server for providing communications using a multimedia service in a communication system is provided. The apparatus includes a call processing control block. The apparatus also includes a server to interwork with a web network. The call processing control block is configured to receive a voice call connection request for a second device from a first device. The call processing control block is also configured to connect a voice call between the first device and the second device. In response to the received voice call connection request, the server is configured to provide the first device with visual multimedia information generated in advance over a web network in relation to the second device.

In a fifth example, an apparatus of a caller device in a communication system is provided. The apparatus includes a first client for voice communications. The apparatus also includes a second client to process data. The first client is configured to request a voice call connection from a callee device and communicate with the callee device. The second client is configured to receive pre-generated visual multimedia information from a server over a web network in relation to the callee device.

In a sixth example, an apparatus of a caller device in a communication system is provided. The apparatus includes a first client for voice communications. The apparatus also includes a second client to process data. The first client is configured to perform voice communications with a callee device. The second client is configured to execute at least one of an application and a web browser during the call and shares at least one of the application and a webpage content executed by the web browser with the callee device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrate an example user interface of a basic call application according to this disclosure;

FIGS. 13A through 13D illustrate an example of web content merging during the call according to this disclosure;

FIGS. 14A through 14D illustrate an example of a game program merging during the call according to this disclosure;

Throughout the drawings, like reference numerals will be understood to refer to like parts, components and structures.

DETAILED DESCRIPTION

Figure 1:
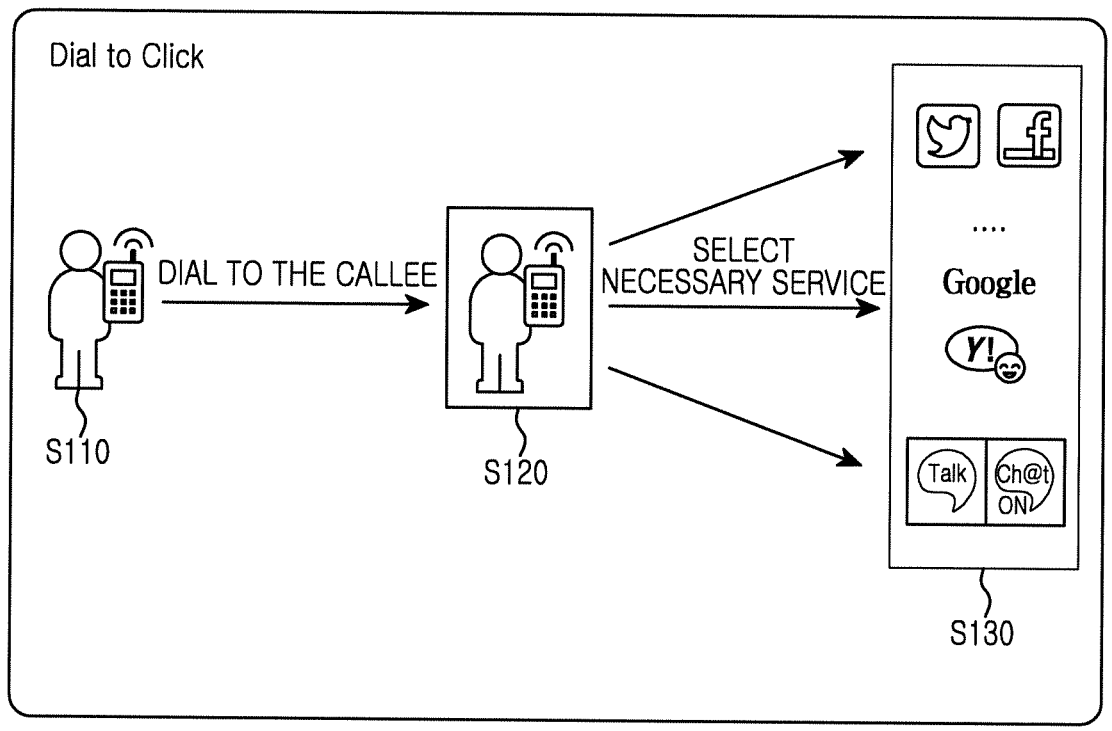
FIG. 1 illustrates an example of communications using a dialweb service according to this disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide an apparatus and a method for supporting visible and audible communications using various multimedia services. That is, exemplary embodiments of the present disclosure provide innovation from communications based on listening and speaking to communications between seeing, listening, and speaking. Conventional communications and their limits are explained first.

The conventional communications using various multimedia services include Rich Communication Suite (RCS) standard of Global System for Mobile Communications Association (GSMA) and a color-ring service. The messaging-centered RCS does not provide a differentiated service against an Over the Top (OTT) messaging solution. With the advent of Voice over Long Term Evolution (VoLTE), communication operators began to aggressively start the RCS to provide the evolved communications since the OTT based messaging service takes the spotlight in the market of conventional Short Messaging Service (SMS)/Multimedia Messaging Service (MMS). In the domestic market, it begins at the beginning of 2012 when smart phones spread and an LTE nationwide network is built. That is, rich messaging is centered than Enriched Call and Enhanced Phonebook standardized in RCS-e, and this messaging service does not provide a more differentiated service than the activated OTT based messaging service.

The RCS technology fails to build an ecosystem between nations and between operators. In Europe, communications users frequently travel around between nations and between mobile communications operators, whereas RCS serviced roaming is not supported seamlessly. As such, the RCS fails to differentiate the service and to build the ecosystem at the early stage of its business and thus has recorded a much lower usage than the OTT service.

User eXperience (UX) such as Enriched Call and Enhance Phonebook of the RCS fails in the differentiation. The current RCS service from the domestic operator enriches various communications such as file, video, and location sharing during the call as defined by the standard. However, such a system function does not spread the service because a device UX provided to the user is not closely related to the call. In addition, while the phonebook in the messaging function provides more improved functions than the conventional phonebook, such as subscriber state information and one-line message, it is not differentiated from the phonebook function of the OTT service.

The color-ring receives an incoming call event in the device installing a separate application, receives and displays in a screen social profile information of the caller from an external server, and thus delivers various information of the caller. Compared to the conventional voice/visual color-ring service, the color-ring efficiently sends identity information of the caller to the callee using a Social Network Service (SNS). However, this method cannot overcome the disconnected data communication information of the color-ring simultaneously with the call connection and cannot leave the screen of an application framework defined by a service provider, and thus content variety is not attained. In addition, the color-ring merely sends the caller profile information to the callee, which is not the exchangeable service.

Hence, the present disclosure provides transition from the audible communications to the visible and audible communications with accordance with the advent of Long Term Evolution (LTE) and smart phone in the communications, like transition from the audible radio to the visible TV, by combining various data communication services with the call beyond the simple voice-centric pattern. In particular, based on the RCS service, the present disclosure provides a service solution package for converging a web service and information stored in private phone/Personal Computer (PC) and cloud system, and supporting basic dialer (such as a basic call application (app) in the smart phone) and multimedia communications of the device.

The present disclosure improves a User Interface (UI) for the RCS. The present disclosure provides a basic framework for improving the UI for the Enriched Call and the Enhanced Phonebook of the RCS, providing an optimized UI for the call by considering four communication steps of phonebook inquiry before the call, call reception, communication, and call termination, and providing voice-centric information delivery between the caller and the callee together with a caller's intended visual data during the call. The present disclosure allows mutual profile exchange and current data service direct sharing during the call. The present disclosure enables the user of the smart phone to use a data service and to concurrently send data service information to the other party during call, without interrupting the current data service, thus enriching the communications. The present disclosure links scattered contents through the call. The present disclosure provides a system for providing exchangeable screen contents during the call by gathering private information scattered over a public cloud, a private cloud, a blog and an SNS, and providing screen information for supporting call communication to exchange with the other party.

FIG. 1 illustrates an example of communications using a dialweb service according to this disclosure. Referring to FIG. 1, beyond voice or data communications which first select a service such as call app or the OTT based messaging service and then select a callee, the present communications select the callee in S110 and the corresponding callee S120 selects a preset screen or services to exchange during the call reception or during the call in S130. Thus, it is possible to change the communications with messaging using the call, SNS access using the call, and web game using the call.

Figure 2:
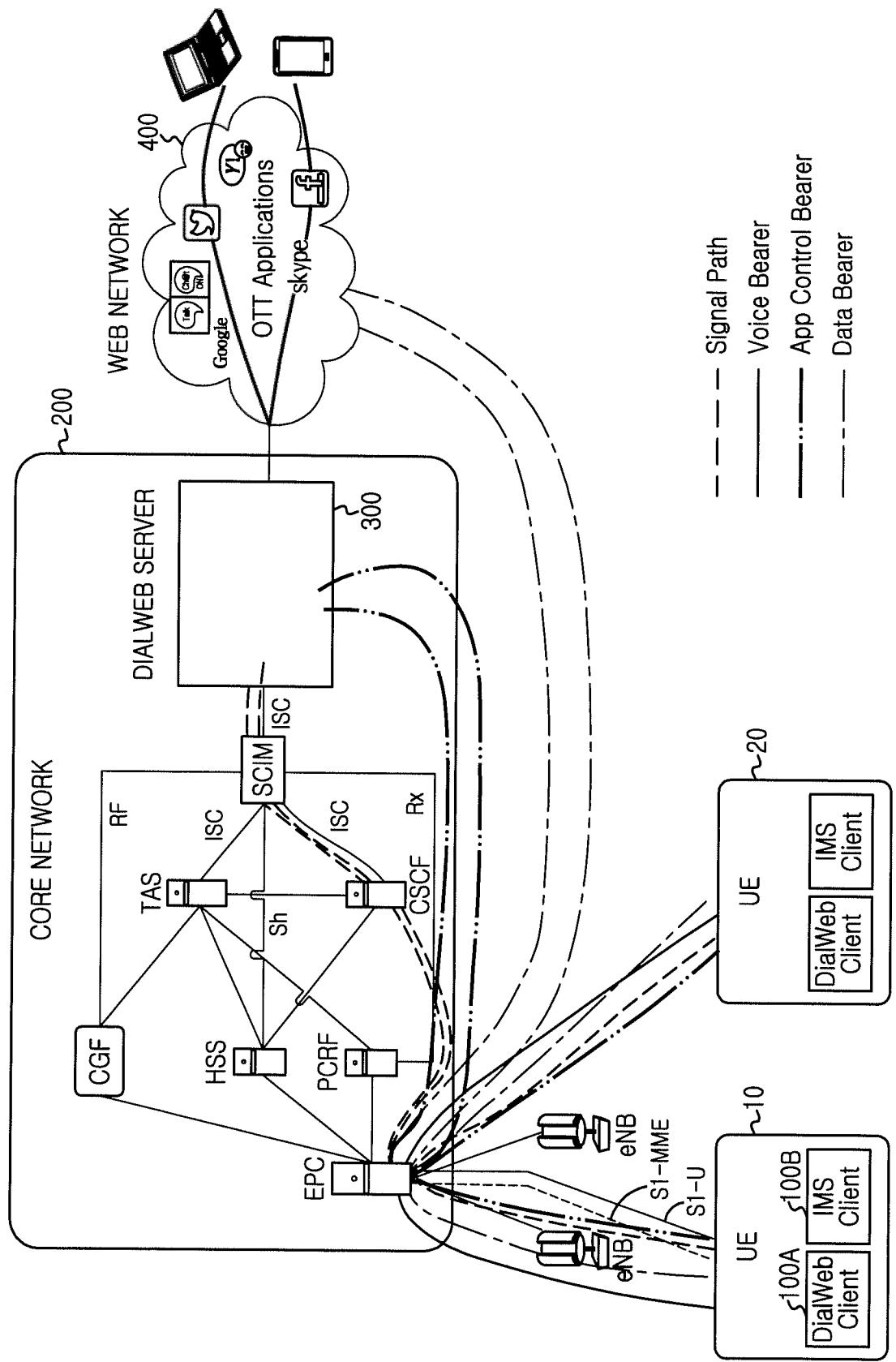
FIG. 2 illustrates an example dialweb network architecture according to this disclosure.

FIG. 2 illustrates an example dialweb network architecture according to this disclosure. Referring to FIG. 2, the dialweb network includes User Equipments (UEs) 10 and 20, an access network, a core network 200, and web network 400. The UEs 10 and 20 each include an Internet Protocol (IP) Multimedia Subsystem (IMS) client 100B for voice call (such as Voice over LTE (VoLTE)). The UEs 10 and 20 each include a dialweb client 100A. For example, the UEs 10 and 20 employs a smart phone. However, similar to the smart phone, the UEs 10 and 20 employs an electronic device for providing not only the voice call service but also a multimedia service, such as smart pad, tablet, and laptop computer. Hereinafter, it is assumed that the UE is the smart phone.

The access network, which is an LTE access network, includes an Evolved Node B (eNB). The core network 200 includes an Evolved Packet Core (EPC), a Home Subscriber Server (HSS), a Policy and Charging Rules Function (PCRF), a Call State Control Function (CSCF), a Charging Gateway Function (CGF), a Telephony Application Server (TAS), and a Service Capability Interaction Manager (SCIM). The core network 200 includes a dialweb server 300.

The web network 400 provides web contents for various multimedia services. For example, the web contents include contents of private blog and SNS and contents stored in a public cloud or a private cloud. As shown in FIG. 2, the core network 200 functions as a server for providing the communications using the multimedia service, and includes the CSCF as a call processing control block and the dialweb server 300 interworking with the web network. The call processing control block receives a voice call connection request to a second UE from a first UE, and connects the voice call between the first UE and the second UE. In response to the received voice call connection request, the server 300 provides the first UE with preset visual multimedia information over the web network in relation to the second UE.

The visual multimedia information includes web content information. The web content information includes HyperText Markup Language (HTML)5 based web contents or web link information. The web content information includes information stored in at least one of the cloud, the blog, and the SNS. The server 300 generates a caller screen in response to the received voice call connection request, establishes a HyperText Transfer Protocol (HTTP) session with the first UE, processes the caller screen, and establishes a HTTP session with the second UE. The caller screen includes a screen for displaying callee information for the voice call, and a screen for searching for the visual multimedia information relating to the second UE.

The server also generates a callee screen, establish the HTTP session with the second UE, and process the callee screen. The UE 10 being the caller device includes the IMS client 100B as the first client for the voice call, and the dialweb client 100A as the second client for the data processing. The first client 100B requests the voice call connection and communicates with the callee device. The second client 100A receives the preset visual multimedia information from the server over the web network in relation to the callee device. The visual multimedia information includes the web content information. The web content information includes the HTML5 based web contents or the web link information. The web content information includes the information stored in at least one of the cloud, the blog, and the SNS.

The second client 100A establishes the HTTP session by the server 300, and displays the visual multimedia information from the server 300 in the caller screen. The caller screen includes the screen for displaying the callee information for the voice call, and the screen allowing the visual multimedia information search.

The UE 10 being the caller device includes the IMS client 100B as the first client for the voice call, and the dialweb client 100A as the second client for the data processing. The first client 100B makes the voice call to the callee device. The second client 100A executes at least one of the application and the web browser during the call, and shares at least one of the application and the webpage content of the web browser with the callee device. The second client 100A further includes a display for displaying a user screen including the voice call screen and the screen for displaying at least one of the application and the webpage content of the web browser. The second client 100A further includes a motion detector for detecting a preset action of the user during the call, and a controller for, when detecting the preset action, executing at least one of the application and the web browser.

Figure 3:
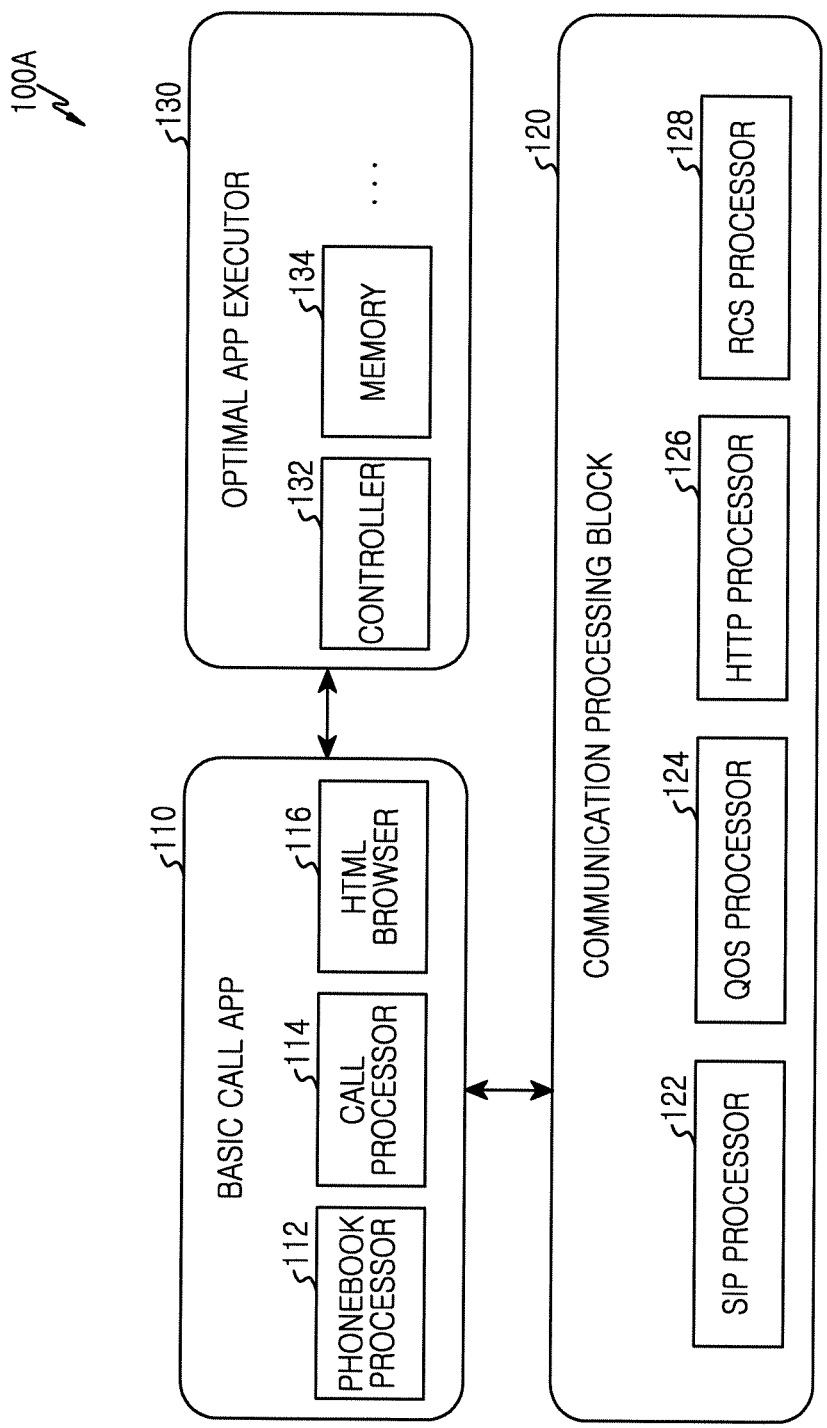
FIG. 3 illustrates an example dialweb client according to this disclosure.

FIG. 3 illustrates an example dialweb client according to this disclosure. For example, the dialweb client employs the dialweb client 100A of the UE 10 of FIG. 2. Referring to FIG. 3, the dialweb client includes a basic call app 100, a communication processing block 120, and an optimal app executor 130. The basic call app 100 includes a phonebook processor 112, a call processor 114, and an HTML browser 116. The communication processing block 120 includes a Session Initiation Protocol (SIP) processor 122, a Quality of Service (QoS) processor 124, an HTTP processor 126, and an RCS processor 128. The optimal app executor 130 includes a controller 132 and a memory 134.

A client device function serving as the basic call app in the smart phone of the UE is designed to provide all the UE functions for the dialweb service and to improve user convenience of a conventional RCS UI. The present disclosure integrates the enriched call UI of the conventional RCS client with the basic call app of the smart phone and thus addresses inconvenience in their separation and differentiation with the OTT solution. Also, the present disclosure embeds the Enhanced Phonebook of the RCS client into the basic call dialer phonebook, and effectively displays HTML5 based user profile information per user.

The basic call app is referred to as a Vtalk app in the meaning that it allows the VoLTE call. The Vtalk app integrates the IMS client function for the VoLTE call, the RCS client supporting the RCS standard, and the present dialweb client function. This function is merged to the basic call app 110 to serve as the basic call app in the device application. The basic call app 110 includes an evolved HTML browser 116 for processing the HTML5 web based multimedia communication, that is, Web Real-Time Communication (WebRTC). The communication processing block 120 manages communications and QoS for the service of a communication operator. The optimal app executor 130 executes an optimal application in the UE.

Figure 4:
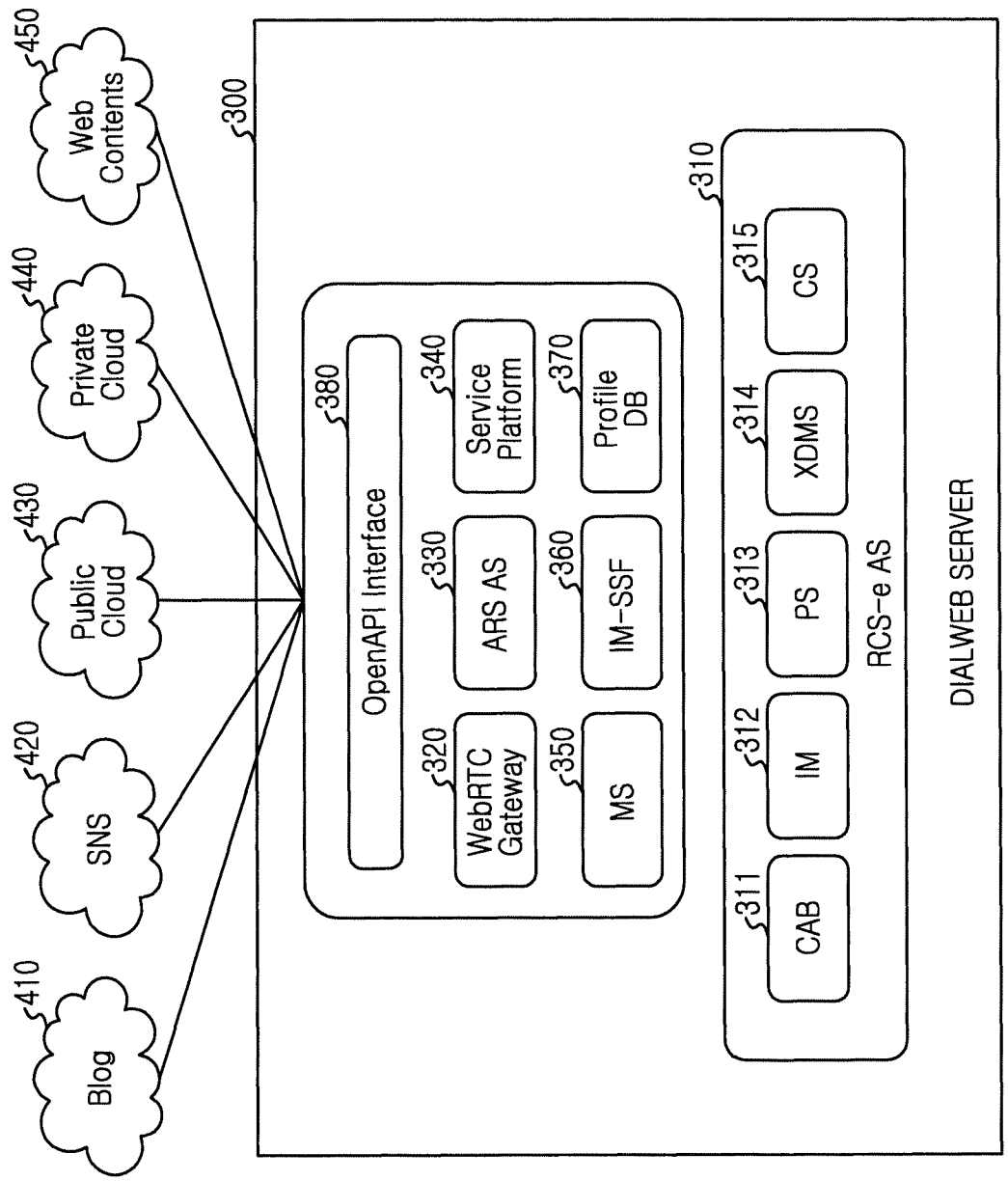
FIG. 4 illustrates an example dialweb server according to this disclosure.

FIG. 4 illustrates an example dialweb server according to this disclosure. Referring to FIG. 4, the dialweb server 300 includes an RCS server 310 supporting Global System for Mobile Communications Association (GSMA) RCS 5.0 standard or more, a WebRTC gateway 320, an ARS server 330, a service platform server 340, a media server 350, an IP Multimedia Service Switching Function (IM-SSF) 360, and a profile database (DB) 370. The RCS server 310 includes, as defined in the standard, an Instant Messaging (IM) 312 for supporting chatting, Presence Server (PS) 313 for providing current user state information, sharing for sharing video, file, and image during the call, location sharing for sharing a location, a Converged Address Book (CAB) 311 for sharing a network based address book and a profile, an XML Document Management System (XDMS) 314 for managing user information, and Contens Server (CS) 315 for providing various contents. The ARS server 330 provides an ARS of the communication operator, and provides the core function for the visible call in association with the RCS server in the personal communication. The media server 350 provides a multiparty communication function during the call.

The WebRTC gateway 320 converts signals and bearer between the WebRTC and the IMS when the WebRTC server of W3C makes a call to the IMS network. The IM-SSF 360 interworks with an Intelligent Network (IN) of the communication operator. The service platform 340 provides an Open Application Programming Interface (API) 380 with the web server to connect the distributed web contents through the call, provides the screen information during the call, and provides a basic platform for realizing/loading various service requests of the communication operator.

Independent of the RCS service standardized to provide the rich communications in the IMS based VoLTE service, the dialweb service of the dialweb server 300 enriches the communications by providing the other party with various HTML5 based web contents, which are and created by the individual, for the voice call and the screen display. In so doing, the displayed web content provides a separate writing tool allowing the individual to easily write the content. The web contents includes almost any contents connectable using www, such as contents of private blog 410 and SNS 420 for connecting the call counterpart using a phone number, and contents stored in a public cloud 430 or a private cloud 440, and legal web contents 450, and are automatically optimized on each UE, with the separate writing tool. Besides the RCS service block, the dialweb server 300 also provides a web caching function which reads, stores, and provides contents referenced by many users among link contents referenced in a webpage created by the individual by connecting private contents or general contents scattered and managed on Internet via the Open API 380.

Figure 5:
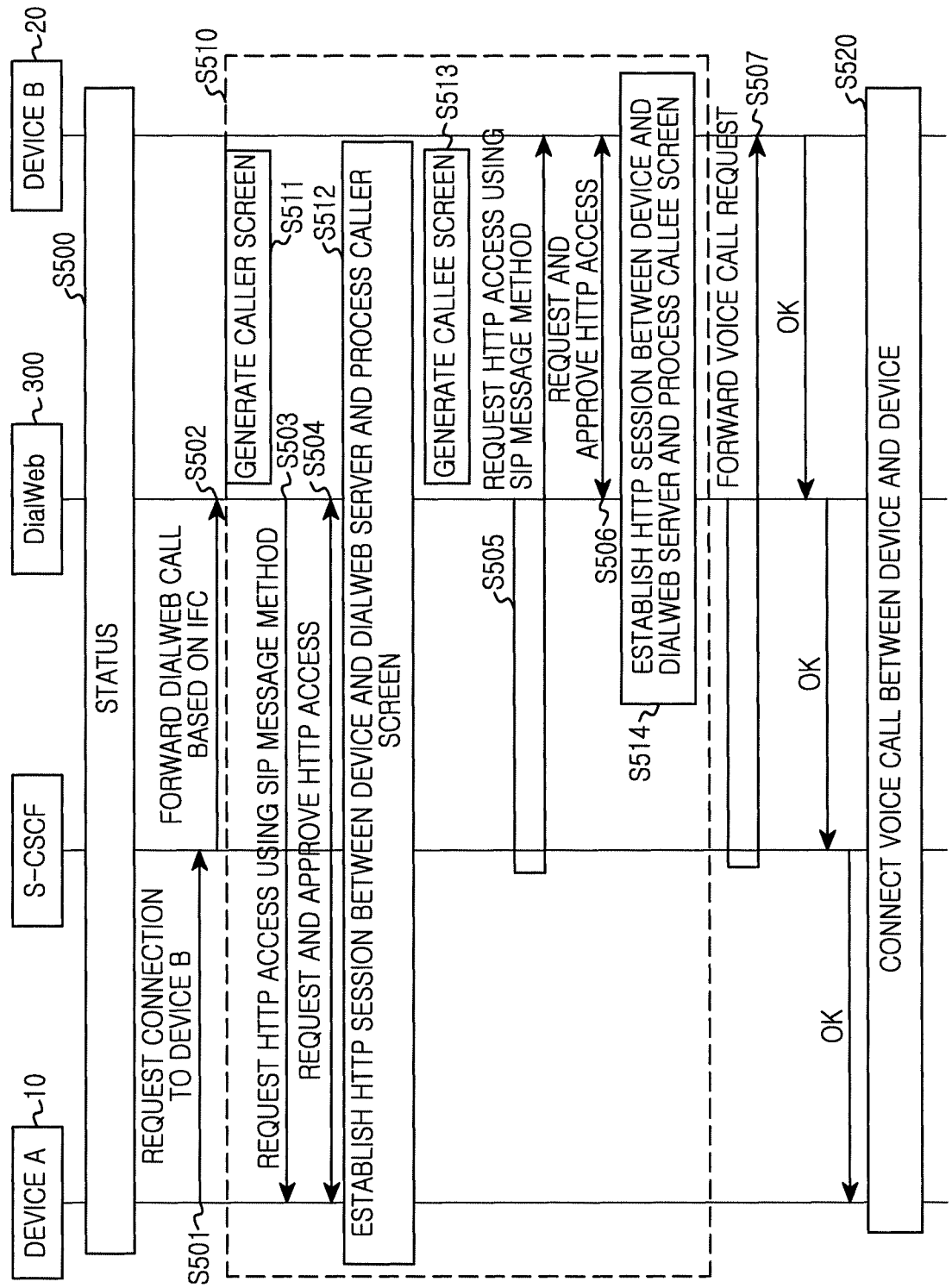
FIG. 5 illustrates an example of call processing for the dialweb service according to this disclosure.

FIG. 5 illustrates an example of call processing for the dialweb service according to this disclosure. Referring to FIG. 5, a device A 10 requests the voice call connection to a device B 20 in S501. Upon receiving the connection request to the device B 20 from the device A 10, the call processing control block S-CSCF recognizes based on a service profile defined in iFC that a user of the device A 10 is subscribed to the dialweb service, and forwards the call setup request to a dialweb server 300 in S502.

The dialweb server 300 accepts the call setup request received via the S-CSCF by serving as an IMS AS 330 in view of the IMS. The dialweb server 300 prepares and generates the user screen of the device A 10 being the caller in S511 and requests HTTP access to the device A 10 being the caller in S503. The HTTP access is requested using SIP messaging. In response the HTTP access request from the dialweb server 300, when the device A 10 requests the HTTP access, the dialweb server 300 approves the HTTP access request of the device A 10 in S504. Next, the HTTP session is established between the dialweb server 300 and the device A 10 and the caller screen is processed in S512. The dialweb server 300 prepares and generates the callee screen in S513 and requests the HTTP access from the device B 20 being the callee in S505. The HTTP access is requested using the SIP messaging. In response the HTTP access request from the dialweb server 300, when the device B 20 requests the HTTP access, the dialweb server 300 approves the HTTP access request of the device B 20 in S506. Next, the HTTP session is established between the dialweb server 300 and the device B 20 and the callee screen is processed in S514.

As such, the dialweb server 300 discovers the content to provide to the user of the device A 10 in the screen information generated by the user of the device B 20 and then commands the device A 10 to download the screen information through the HTTP access in S503. In so doing, the dialweb server 300 determines whether the user of the device A 10 is authorized to access the corresponding web content. When not discovering the accessible web content, the dialweb server 300 skips S510 including S503-S506 and S511-S514 and merely connects the voice call in S507 and S520. By contrast, when discovering the accessible web content, the dialweb server 300 performs S510 including S503-S506 and S511-S514 and connects the voice call in S507 and S520. In S510, the dialweb server 300 builds a data path between the device A 10 and the device B 20 and provides a user screen sharing service. The voice call is connected in a manner that the dialweb server 300 forwards the voice call request to the device B 20 via the S0-CSCF in S507 and the device B 20 responds to the received voice call request (OK). Thus, the voice call is connected between the caller device A 10 and the callee device B 20.

After the data path for the multimedia service and the voice call are built between the device A 10 and the dialweb server 300 and between the dialweb server 300 and the device B 20, the web contents on the screen per user is controlled per user. For example, when the same screen is controlled between the device A 10 and the device B 20, it is controlled per user through the paths between the device A 10 and the dialweb server 300 and between the dialweb server 300 and the device B 20. In so doing, the screen control authority is defined by a menu on the device.

According to the flow of FIG. 5, the QoS for the established data path is processed as follows. Fundamentally, the VoLTE service using the IMS is allocated a separate path of Guaranteed Bit Rate (GBR) for the call. However, the general HTTP access in the UE is allocated the path of Best Effort (BE). When the data service tightly coupled with the voice is given the QoS different from the voice in the data path, the service quality experienced by the user is extremely degraded. Although the present disclosure provides the communication service based on the web, in order to use the same Access Point Name (APN) as the IMS service, the UE is allocated the APN equivalent to the IMS APN separately allocated and the EPC performs separate filtering for individual subscriber path management. Thus, the IMS voice path and the HTTP data path of the dialweb service attains the quality of the same IMS APN.

The flow of FIG. 5 corresponds to the same operator of the device A 10 and the device B 20. Even when the device A 10 and the device B 20 do not belong to the same operator, the service is fulfilled as shown in FIG. 5 through network interworking between the operators. For example, user roaming and the network interworking between different operators conforms to GSMA IR.65 GSMA IMS Roaming and Interworking Guidelines and IR.90 RCS Interworking Guidelines. Now, the basic call app (the Vtalk app) for the visible communications is explained. The basic call app Vtalk basically includes all of the IMS client function for supporting the VoLTE call, the RCS client function for supporting the RCS 5.0, and the dialweb client function, and operates as the basic call app on the UE (such as a smart phone). The Vtalk app supports not only a basic active mode of FIG. 6A but also a reduce mode (or a minimize state) of FIG. 6B. Hence, various apps installed in the wallpaper is accessed at any time during the call.

FIGS. 6A and 6B illustrate an example user interface of a basic call application according to this disclosure. FIG. 6A shows the basic active screen and FIG. 6B shows the minimized screen. Referring to FIGS. 6A and 6B, a screen displays menus 1001 of a call, a video call, a messaging/IM, logs, and contacts. A screen 1002 displays a user input with the call button pressed, displays search results according to the character and number input of the user, and concurrently provides a function for accessing various services based on the searched user information. A screen displays a user control 1003 for adjusting a screen size of the basic call app. The user defines the size of the basic call app on the screen of the UE by pushing up or down the user control 1003. The user control 1003 provides the call app allowing the screen control, and thus the user accesses various applications or webpages of the UE during the call and shares the application or the webpage content during the call using the Vtalk app. The present disclosure enables the interworking with a mobile communication network such as IMS network or 3G.

The selection for making the IMS call for the VoLTE call or the conventional 3G voice call is basically controlled using a separate setting menu of the UE. However, when the user presses the call button, the IMS call for the VoLTE call is basically issued. The call to the callee delivers the IMS call or the 3G voice call according to the network determination based on the state of the callee device. When the user uses the 3G voice call or the device cannot use the dialweb service, the general call is connected via a signaling gateway and a media gateway according to a standard for interworking 2G and 3G mobile communication networks in the IMS.

The present disclosure provides an SMS/MMS merging RCS messaging function. Referring to FIGS. 6A and 6B, a messaging button (the third menu on the left in the menus 1001) issues RCS basic instant messaging. Typically, the messaging button of the smart phone sends an SMS message or an MMS message. The messaging button selection is controlled by the user using a separate setting menu of the UE. The RCS server provides an alternative service to the callee device which is not subscribed to the RCS service or the subscriber who uses the UE not supporting the RCS.

The present disclosure provides a device and network merging and SNS merging phonebook. Referring to FIGS. 6A and 6B, when the user presses the contacts button (the first menu on the right in the menus 1001), the device phonebook and network contact information stored in the CAB of the RCS server is displayed together by default. Corporate client information subscribed to the ARS service of the dialweb service is displayed together. When the searched callee is set to read and send a message about social profile information of the caller, a certain number of recent messages from the corresponding SNS service are displayed on the corresponding screen or the instant message transmission is provided. The contacts button concurrently inquires into the HTML5 based screen which is defined by the callee as the mutual profile exchange information during the call. The unified contact search is depicted in FIGS. 7A through 7D and FIGS. 8A and 8B.

Figure 7A:
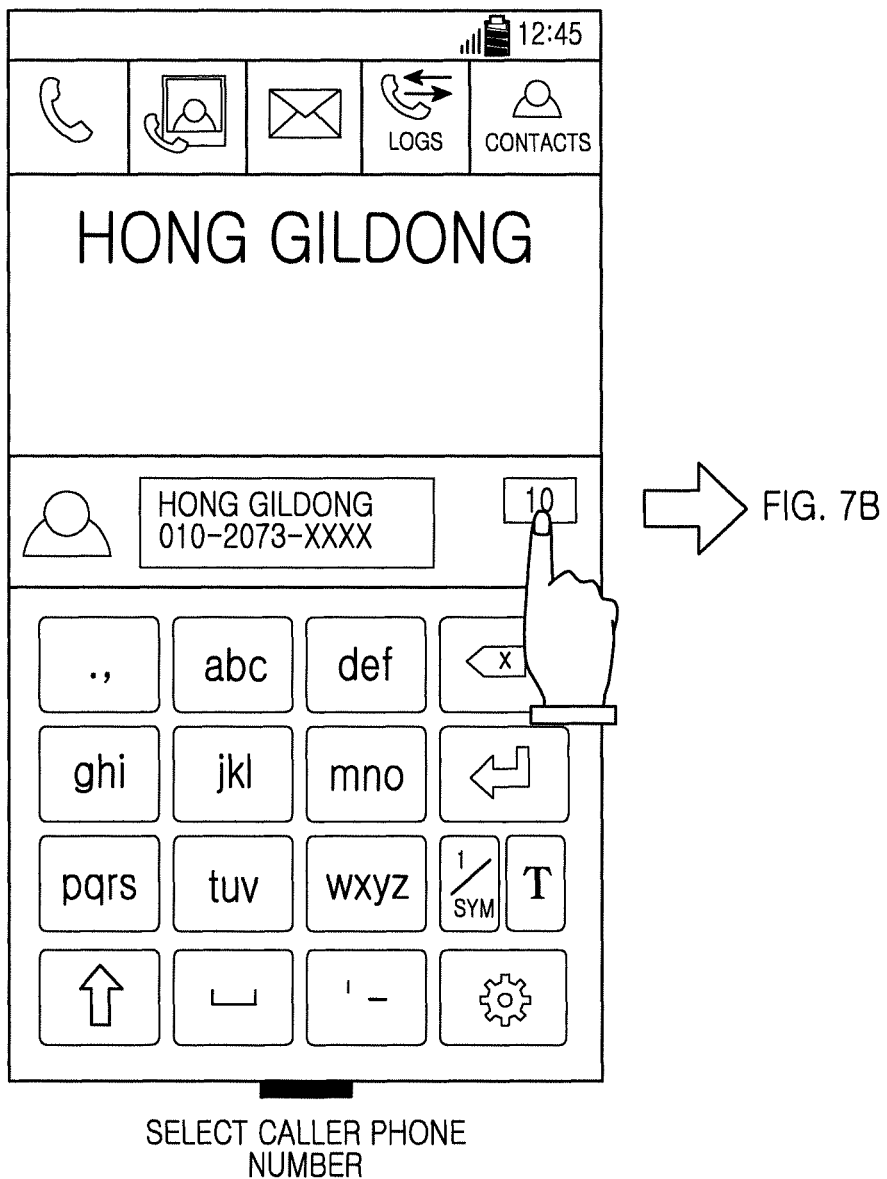
FIGS. 7A through 7D illustrate an example personal contact search according to this disclosure.
Figure 7B:
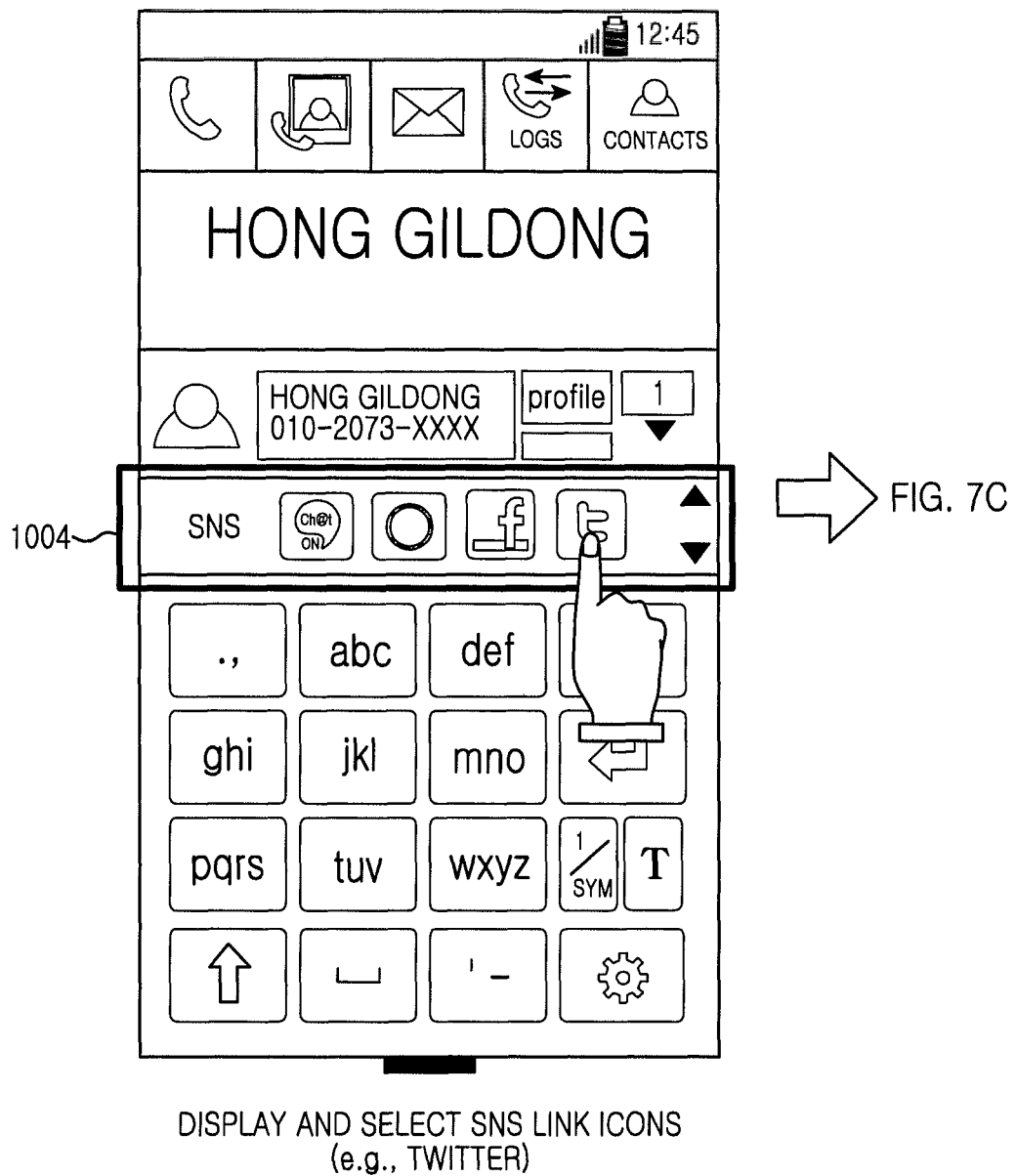
Figure 7C:
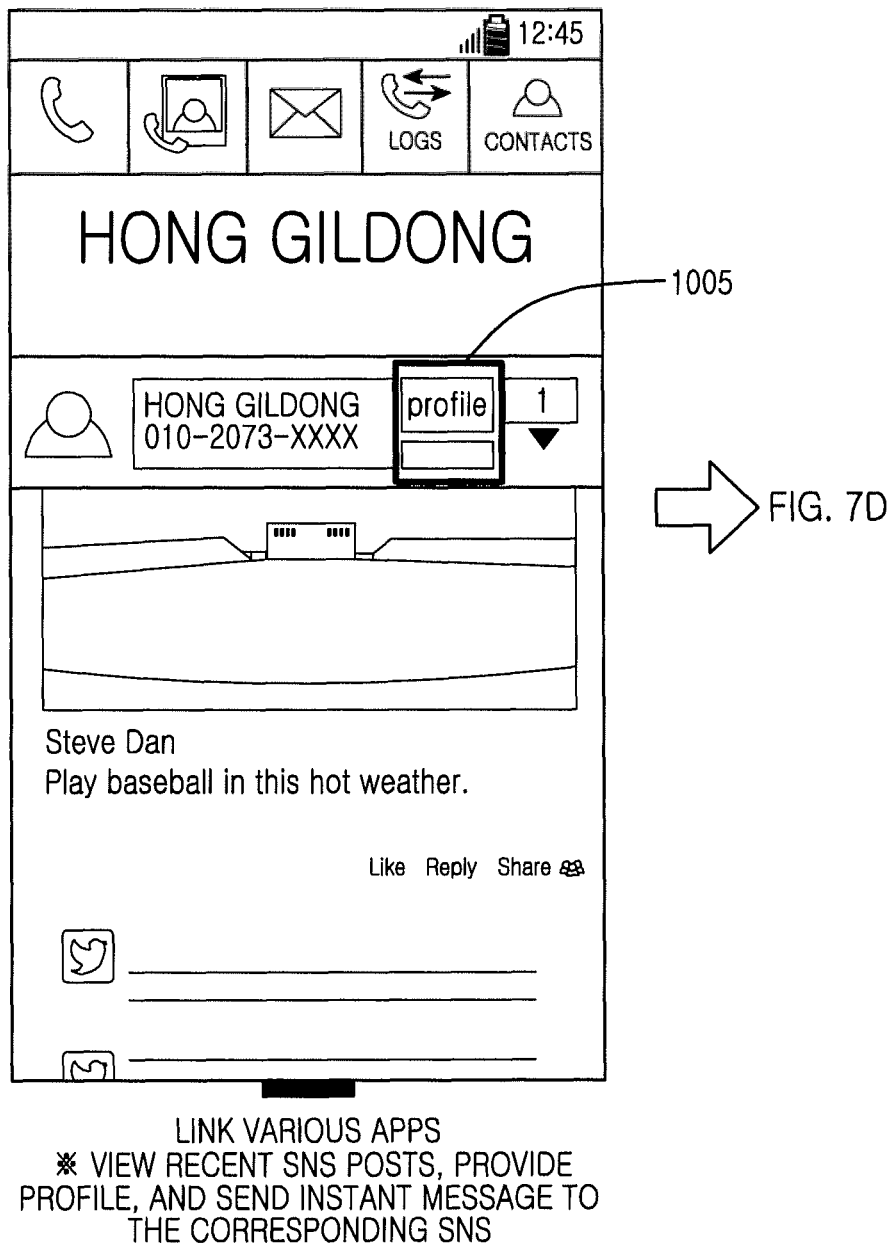
Figure 7D:
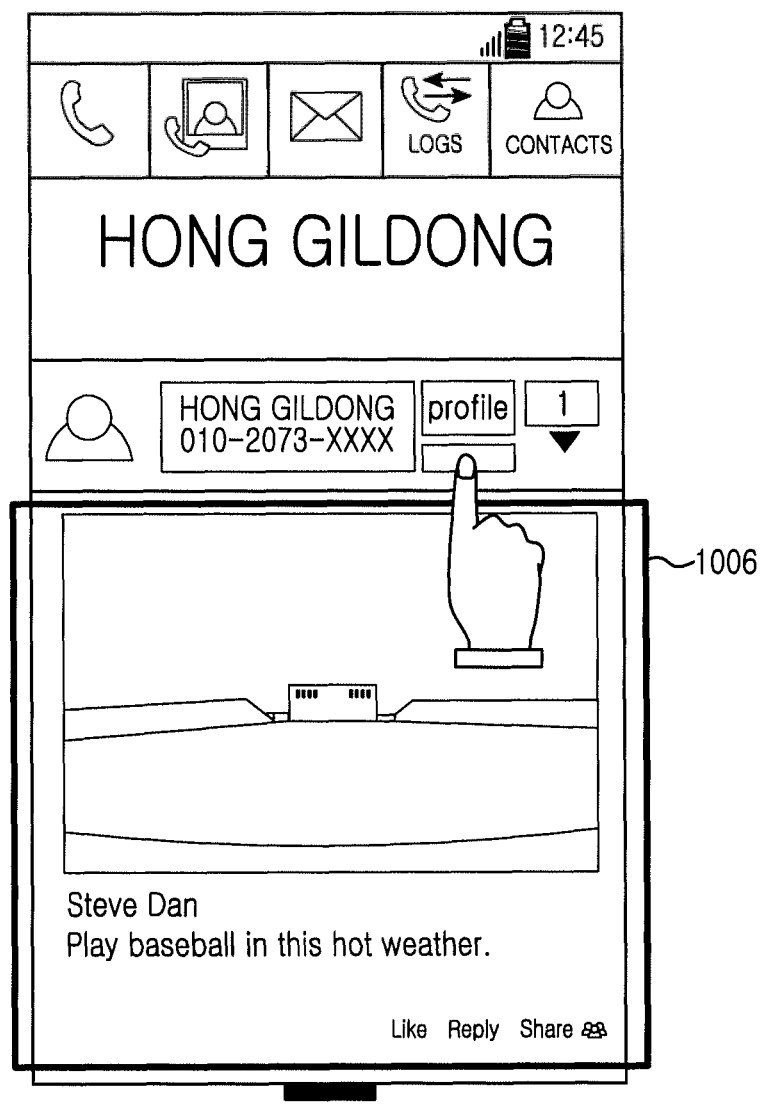

FIGS. 7A through 7D illustrate an example personal contact search according to this disclosure. In FIGS. 7A through 7D, as the person search, the SNS link function supports the person contact search stored in the device or the dialweb server using the Vtalk app. When the caller selects the callee 'Hong Gingdong' in FIG. 7A, an SNS list 1004 of the callee is displayed in FIG. 7B. When the SNS list 1004 is displayed, the Vtalk app provides the function allowing the caller to read a recent message of the SNS of the SNS list 1004 of the callee and leave a brief message as shown in FIGS. 7A and 7B. The Vtalk app also provides a function for inquiring about the blog defined by the callee as the profile information to share with the other party during the call in a screen 1006 using a profile inquiry button 1005 as shown in FIGS. 7C and 7C. The screen 1006 is a HTML5 browser in the Vtalk app.

Figure 8A:
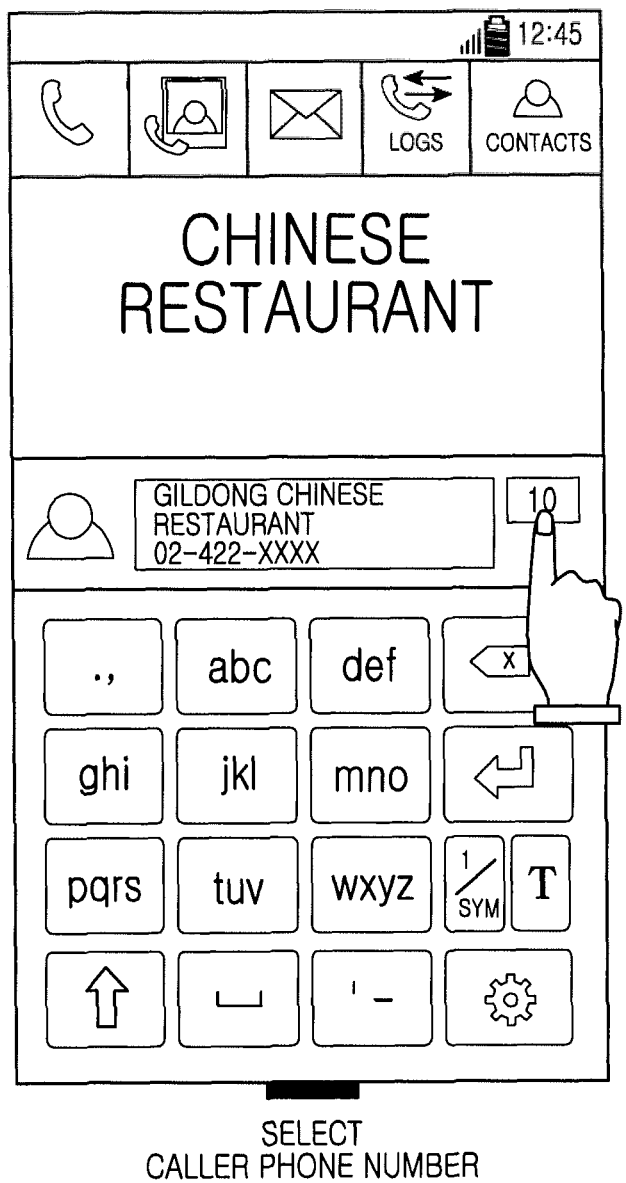
FIGS. 8A and 8B illustrate an example mutual contact search according to this disclosure.
Figure 8B:
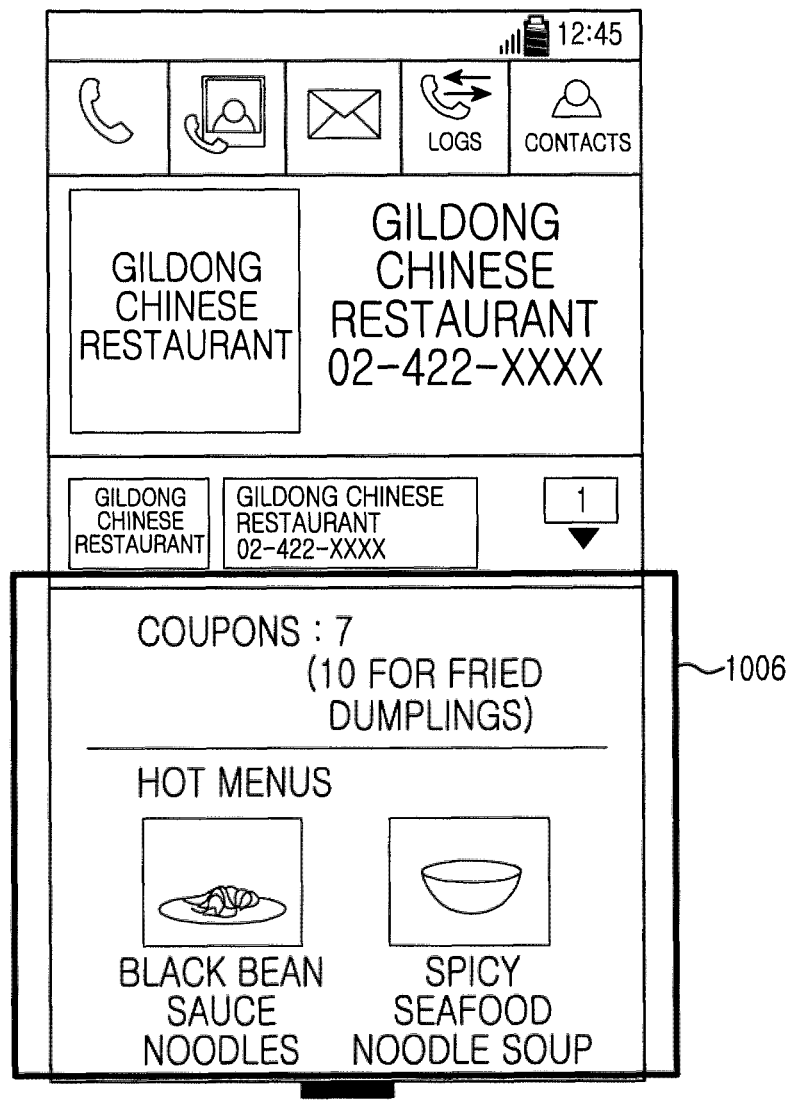
Figure 9A:
FIGS. 9A through 9D illustrate examples of various profile exchanges according to this disclosure.
Figure 9B:
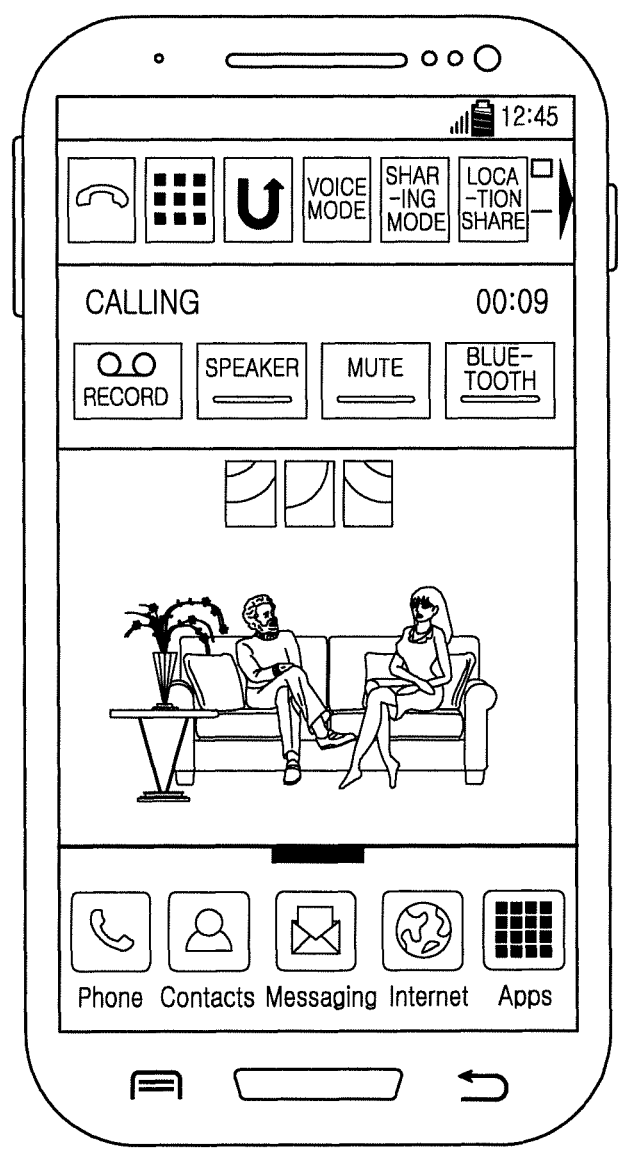
Figure 9C:
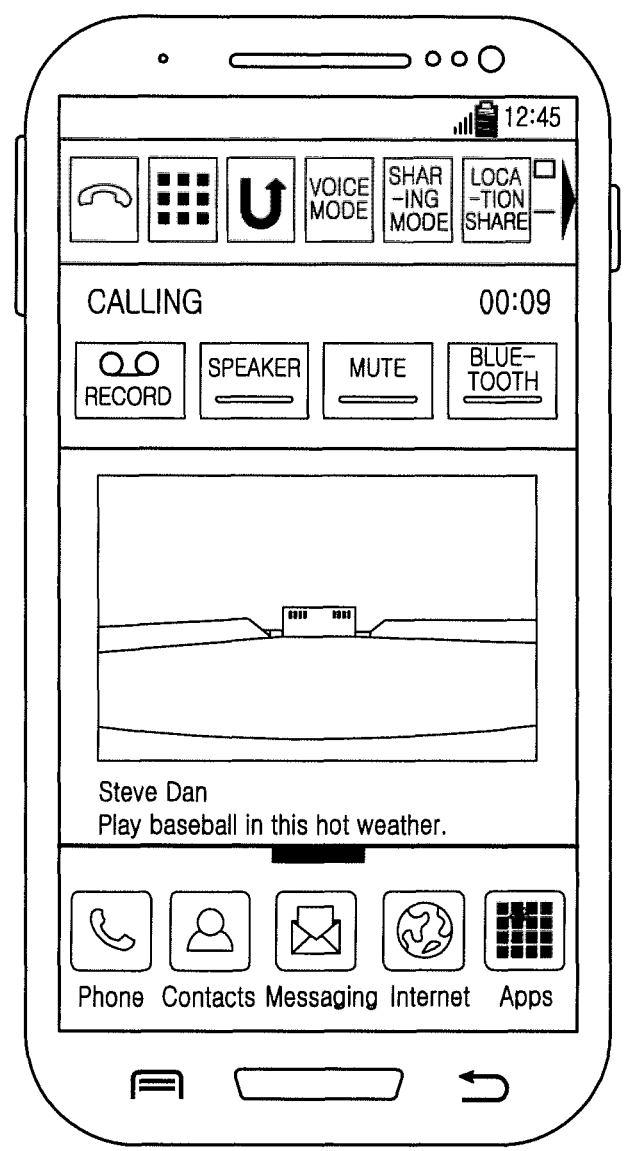
Figure 9D:
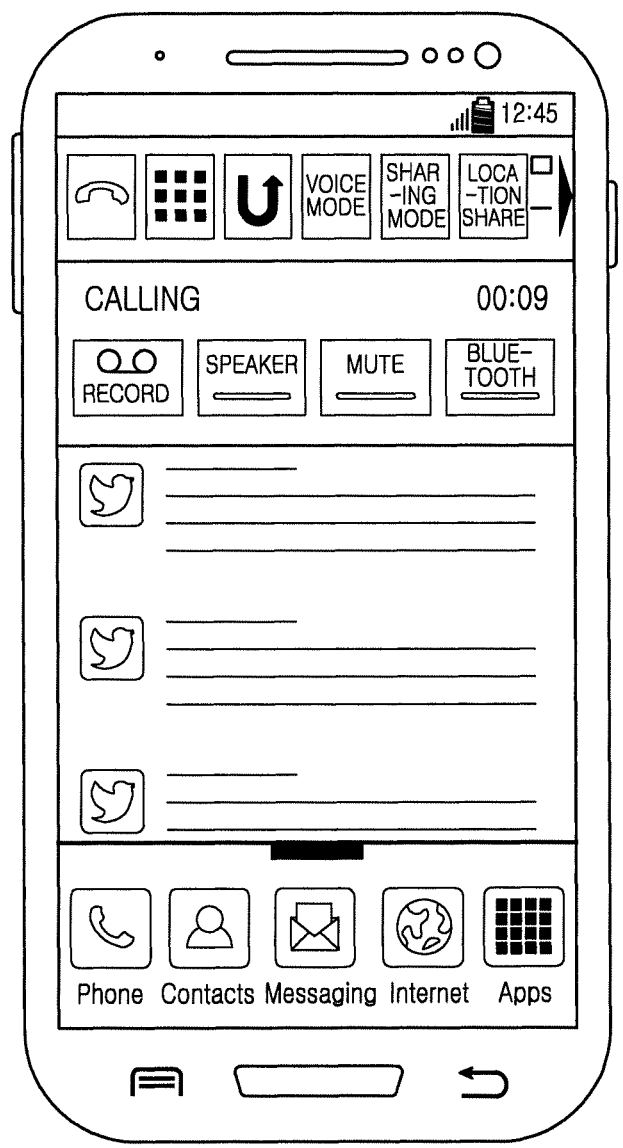

FIGS. 8A and 8B illustrate an example mutual contact search according to this disclosure. FIGS. 8A and 8B depict, as the unified search, the Vtalk app displays search results of the contact of the device or a company name registered by the dialweb server, and integrates additional information (such as location, coupon advertisement, event, and main menu) of the corresponding company with the phonebook. Advertisement content information pre-registered by the company to the dialweb server is integrated to the contacts of the device so that it is displayed in the HTML5 browser 1006 of FIG. 8B.

FIGS. 9A through 9D illustrate examples of various profile exchanges according to this disclosure. Referring to FIGS. 9A through 9D, various profiles set by the user is exchanged between the call service users at the phase of the contact search and the call connection. The profile inquiry is serviced at not only the contact search but also the call connection to the other party. The content displayed on the screen according to the profile inquiry is stored in the dialweb server, and the dialweb server reads the content stored in an external Internet through the Open API.

Profile creation is supported based on the HTML5, and profile information includes content (such as every content or almost every content). For example, not only HTML (such as FIGS. 9A and 9B) containing resources such as text, photo, media, and music stored in the dialweb server but also various contents (FIGS. 9C and 9D) stored in a portal site blog is linked to the profile HTML file. The present disclosure provides easy user accessibility and chatting screen sharing function. According to characteristics of the smart phone, the user arbitrarily installs and uninstalls a number of applications. While the call app is separately installed for the user's convenience, the present disclosure provides a method for executing the call app by shaking the smart phone to make the most of multithreading call.

Figure 10A:
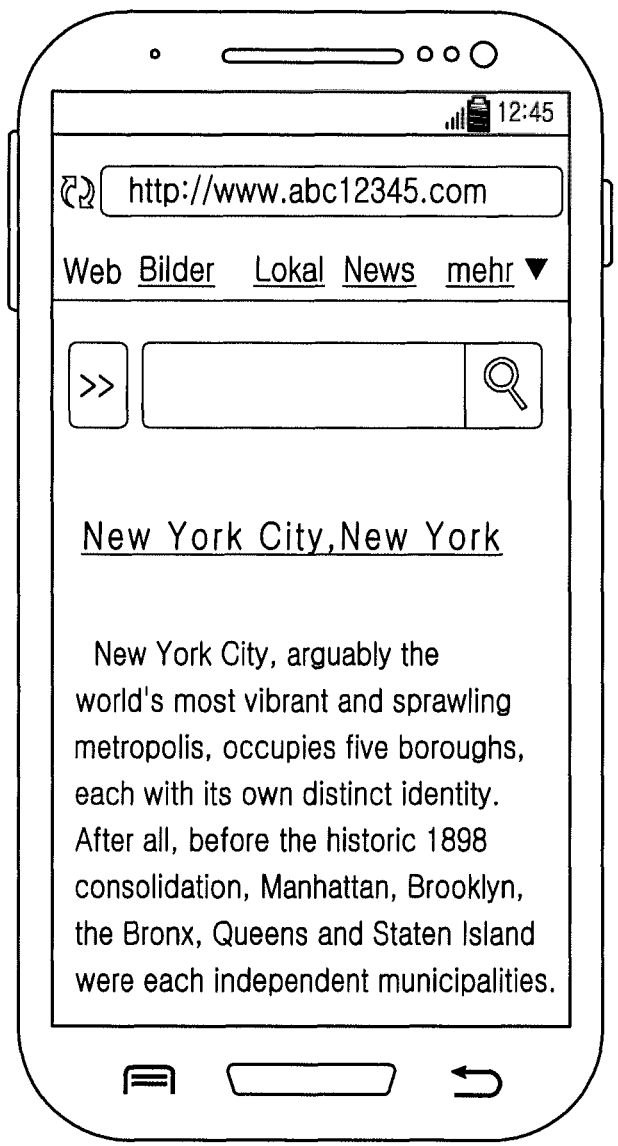
FIGS. 10A through 10F illustrate examples of easy user accessibility and sharing screen transfer according to this disclosure.
Figure 10B:
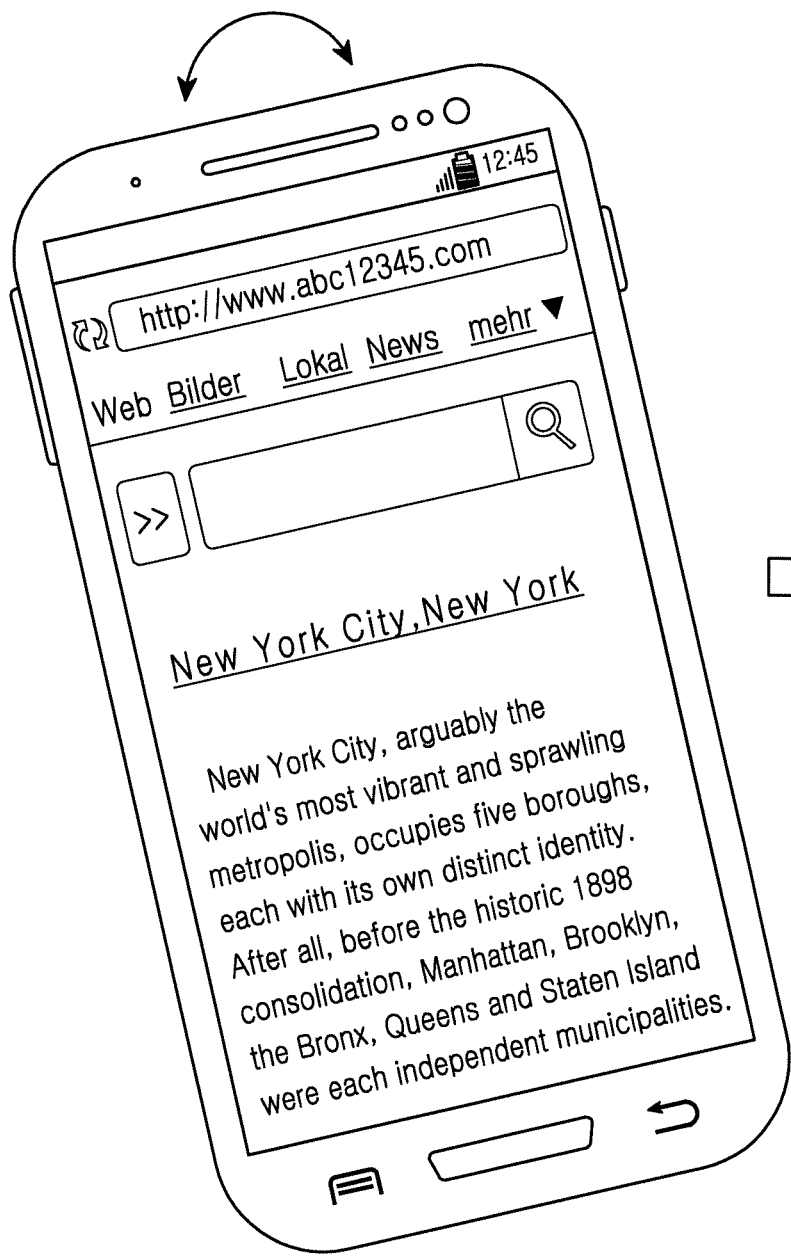
Figure 10C:

FIGS. 10A through 10F illustrate examples of easy user accessibility and sharing screen transfer according to this disclosure. Referring to FIGS. 10A through 10F, when the user uses the Internet in the UE, finds a specific content on the Internet, and selects and makes a call to an arbitrary callee, the content of the Internet is immediately delivered so as to chat with the callee about the same content. The Vtalk app is executed by a user's particular action (such as shaking the phone twice) as shown in FIG. 10B, and thus the users easily shares the screen. The executed call app of the UE is positioned at the top of the ongoing application as shown in FIG. 10C.

Figure 10D:
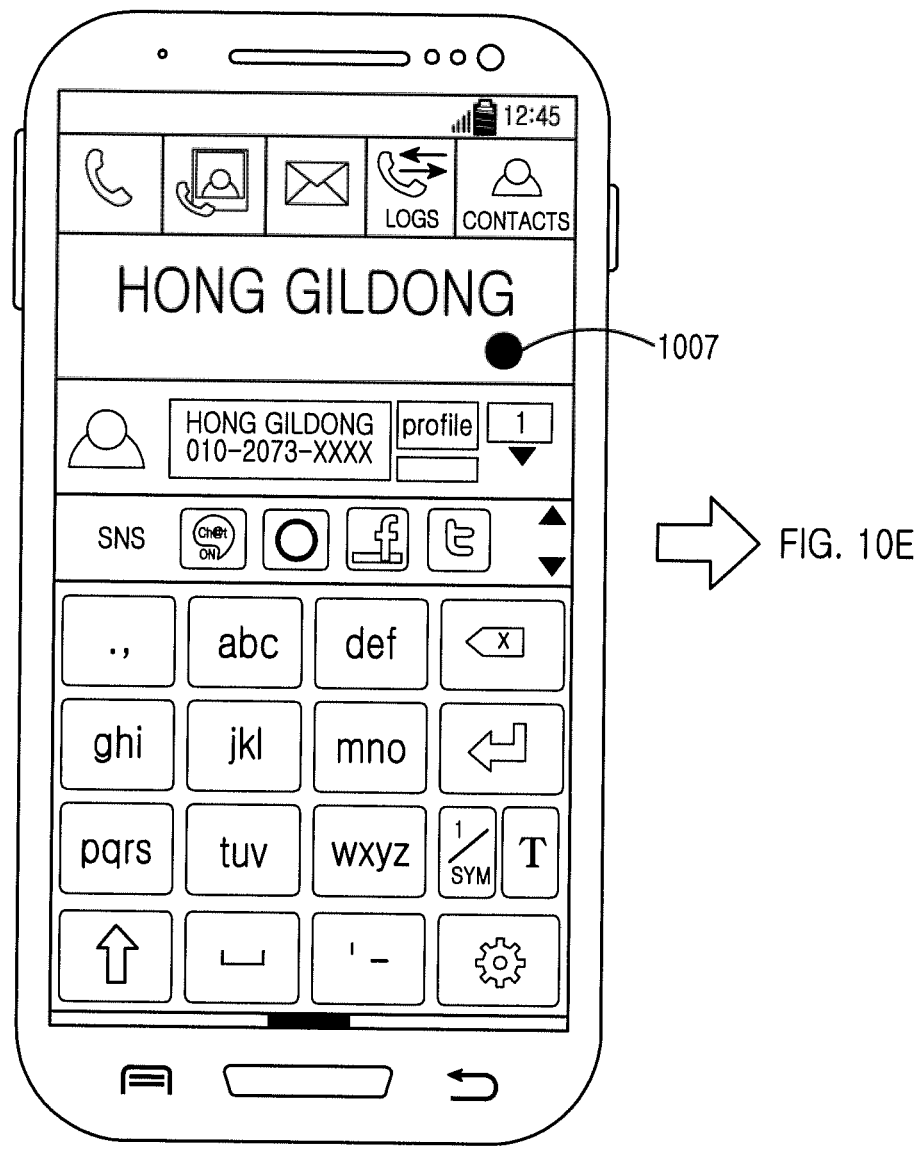
Figure 10E:
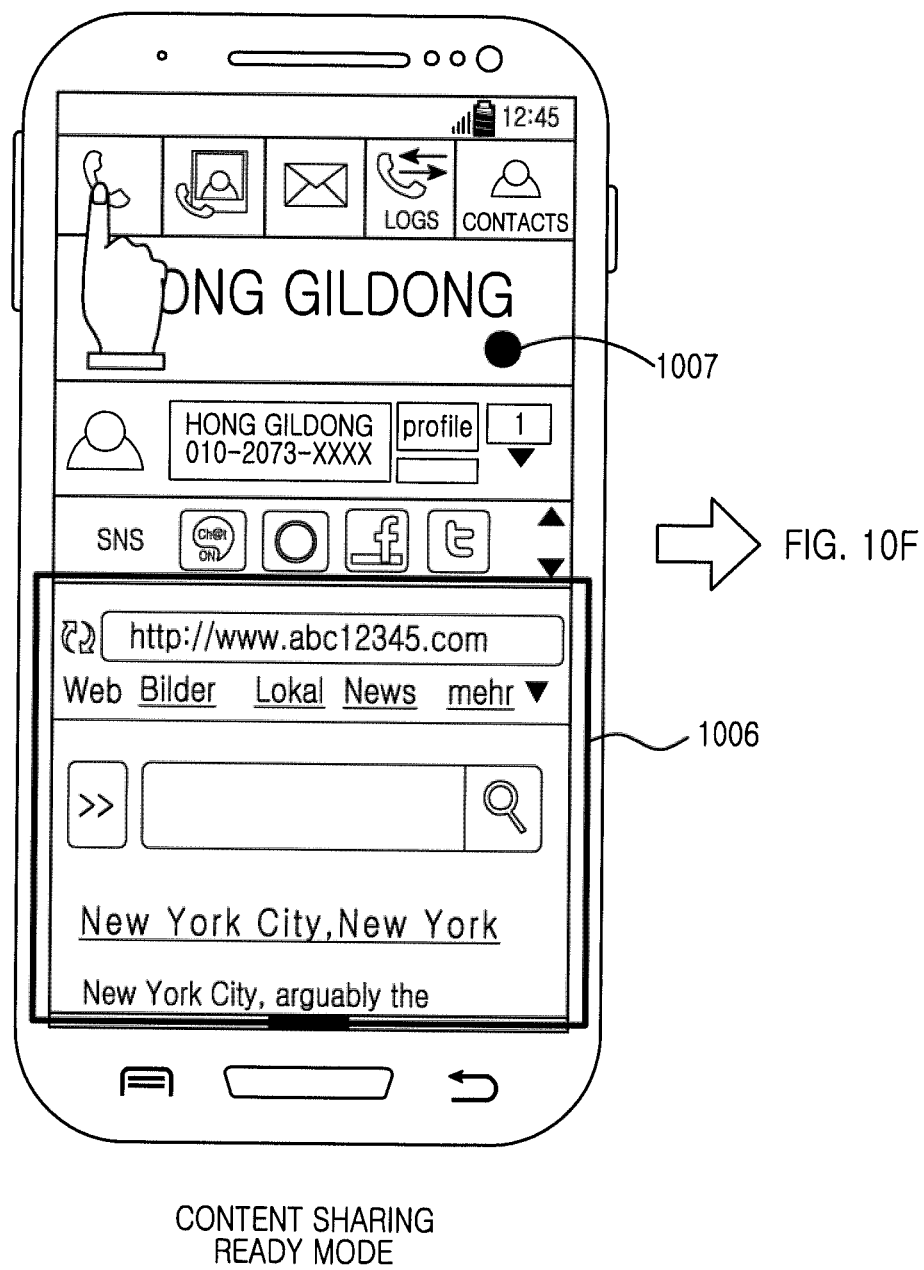
Figure 10F:
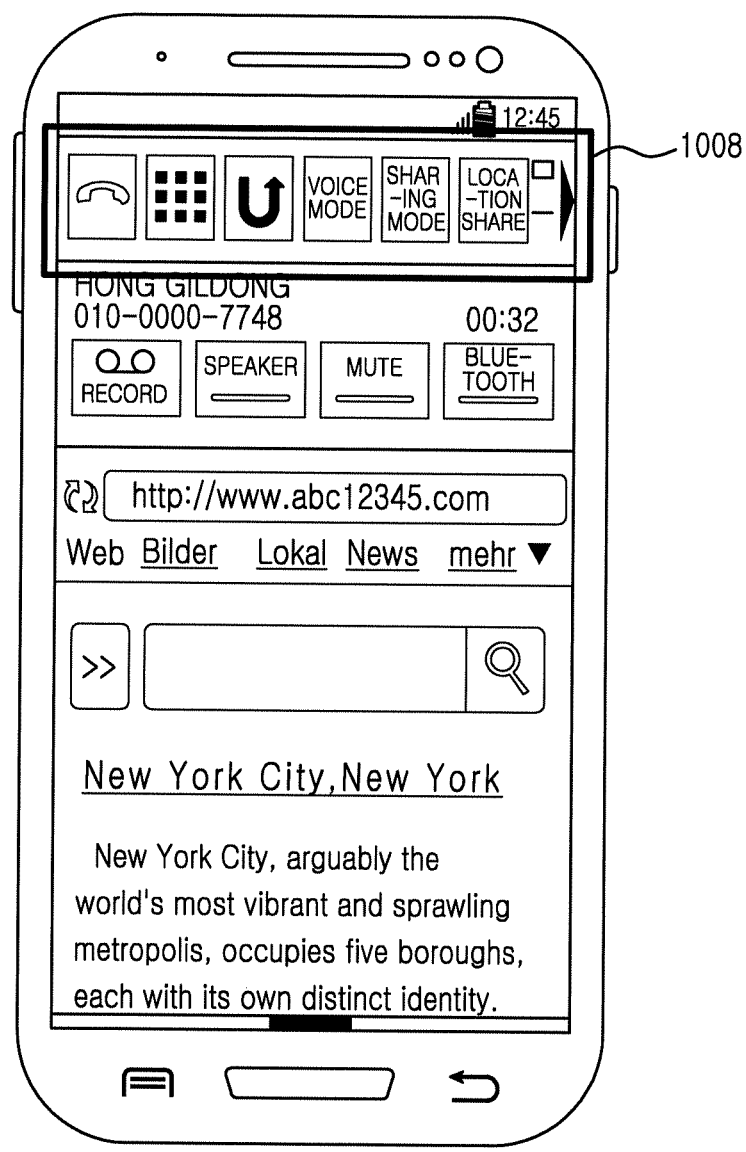

When the application right below the UE app includes the Vtalk app and a content sharing application (such as a general web browser), a state button 1007 indicates that the content sharing app is ready for the sharing as shown in FIG. 10D. When the user intends to share the content in the Vtalk app by clicking the state button 1007, the color of the state button 1007 is turned to green and the application in the second layer is displayed in the HTML5 browser 1006 of the Vtalk app as shown in FIG. 10E. When the user presses the call button, the call is connected to the callee and the two parties share the content during the call as shown in FIG. 10F.

As shown in FIGS. 10A through 10F, the user experience is enhanced such that the user accesses the call function in the UE anytime and anywhere. Simultaneously, to share the content of the UE through the call with the other party, the current visual subject is shard together with the voice call. The present disclosure facilitates the access to the RCS and the additional service menu during the call. The present disclosure allows the user to make the call together with the visual information, thus enhancing the user experience and enriching the call. For doing so, the present disclosure provides a screen UI for easily accessing the RCS additional service and to exchange the visual information about the chatting during the call.

Figure 11B:
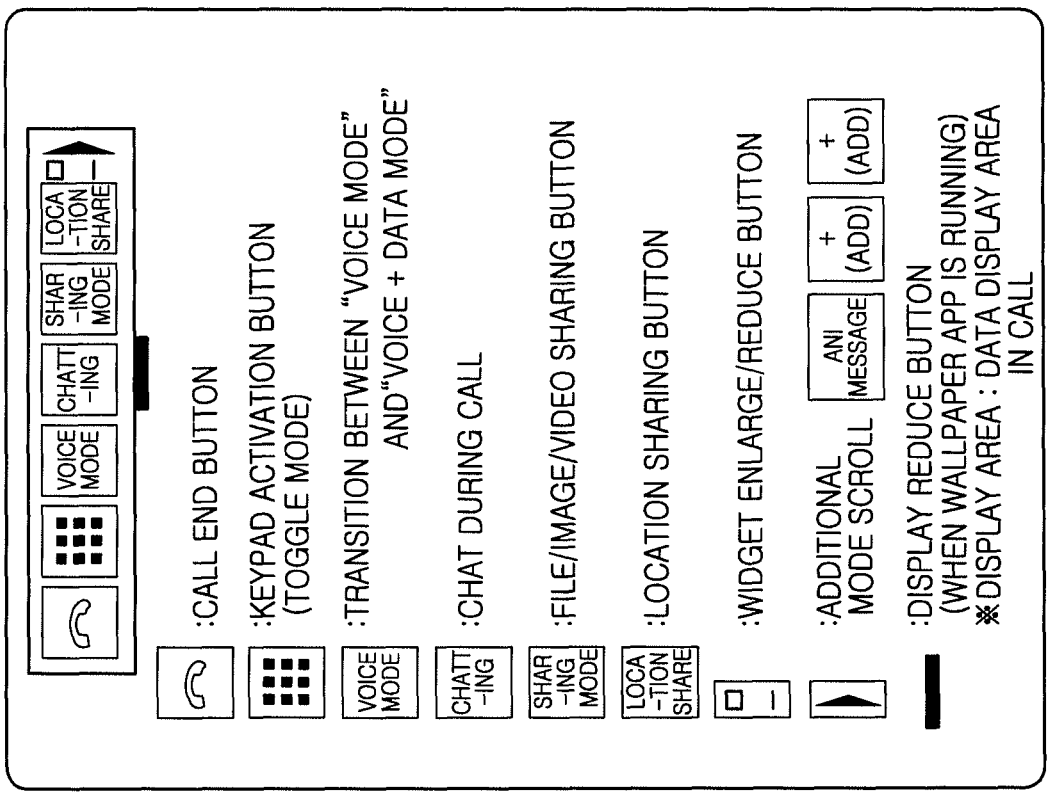
FIGS. 11A and 11B illustrate an example screen for easy service menu access during a call according to this disclosure.
Figure 11A:
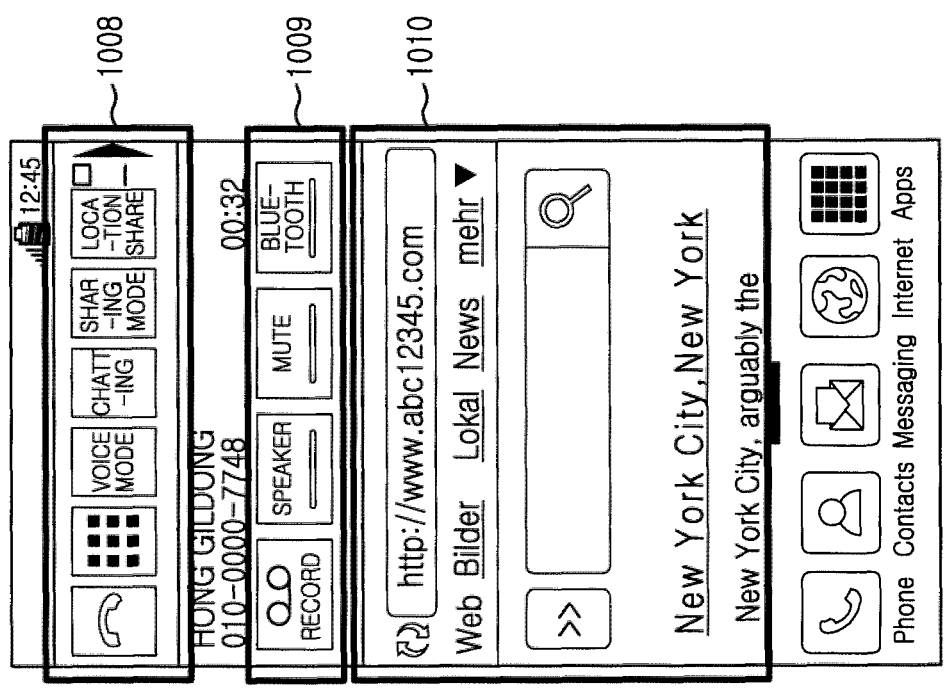

FIGS. 11A and 11B illustrate an example screen for easy service menu access during a call according to this disclosure. Referring to FIG. 11A, a control executor 1008 facilitates the access to the dialweb service menu. The UE provides a control executor 1009 of the general call service. For example, the control of the control executor 1009 supports functions such as record, speaker, mute, and Bluetooth. An area 1010, which is the HTML5 browser, executes a simple program requiring the communication with the web content or the server and including several controllers, that is, an application such as game. The control of the HTML browser enables the mutual profile exchange, the content exchange, and the game during the call.

Referring to FIG. 11B, the control executor 1008 performs various functions. The functions of the control executor 1008 are as the following Table 1.

TABLE 1 end call button: terminate the current call.
keypad activation button: activate and deactivate the keypad in a toggle mode.
voice mode transition: transition between the voice mode and the vide mode
※In the voice mode, the data bearer of the device is disconnected.
chatting button: by executing the instant messaging of the RCS service during the call, make the voiceless call between peers and provide various services of the IM (provide service continuity of group chatting)
sharing button: file sharing, image sharing, and video sharing of the RCS
location sharing button: location sharing service of the RCS
widget enlarge/reduce button: maximize and minimize the Vtalk app on the UE
additional function scroll button: enable a communication part to add services such as communication operator WAS and IN service in addition to the dialweb basic service.

The present disclosure provides a free screen expansion function for accessing various apps.

Figure 12A:
FIGS. 12A through 12F illustrate an example screen expansion for accessing various apps during the call according to this disclosure.
Figure 12B:
Figure 12C:
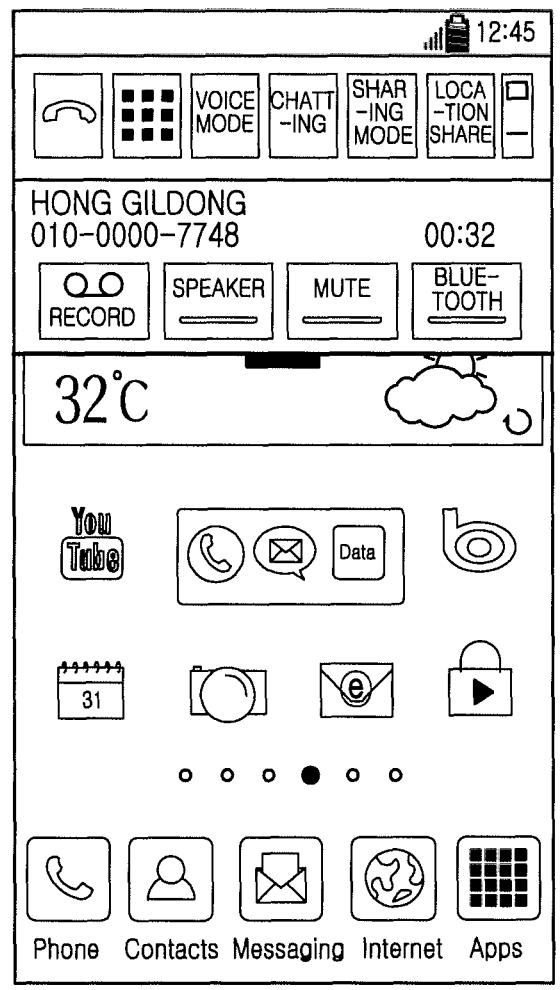
Figure 12D:
Figure 12E:
Figure 12F:
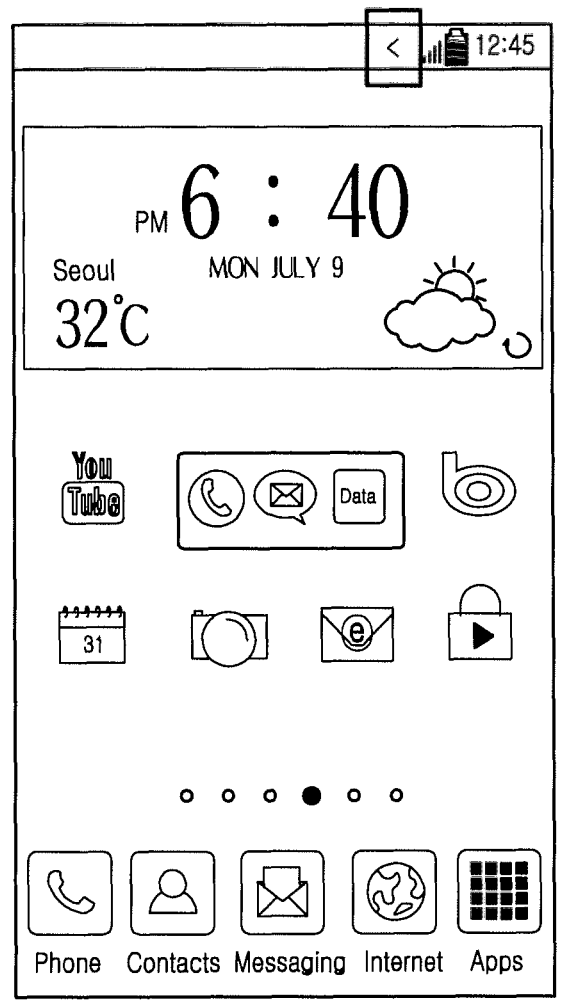

FIGS. 12A through 12F illustrate an example screen expansion for accessing various apps during the call according to this disclosure. FIG. 12A shows a full screen mode, FIG. 12B shows a normal mode, FIG. 12C shows a voice call mode, FIGS. 12D and 12E show voice call minimize mode, and FIG. 12F shows a status bar mode.

As shown in FIGS. 12A through 12F, several screen modes ensures continuity with the voice call mode, concurrently access various applications and contents of the UE during the call, and share the content with the other party through the dialweb service using the Open API provided by the Vtalk app to the application in the UE. The present disclosure provides the web browser search content sharing during the call.

FIGS. 13A through 13D illustrate an example of web content merging during the call according to this disclosure. FIGS. 13A and 13B show the caller screen, and FIGS. 13C and 13D show the callee screen. Referring to FIG. 13A, to send the visual information about the content during the current call, the caller executes the web browser of the UE in the voice call mode of the Vtalk app, finds particular information using the webpage search, and enters the sharing mode. In so doing, the Vtalk app reads from the OS the application information running right under the current Vtalk app. When the application is the web browser, the Vtalk app fetches a Uniform Resource Locator (URL) corresponding to the current screen of the corresponding web browser and sends only the URL to the callee. In FIG. 13B, the content corresponding to the searched URL in the web browser is moved and merged in the HTML5 browser of the Vtalk app.

FIG. 13C shows the callee screen, and FIG. 13D shows that the content of the URL received from the caller is merged and shared in the Vtalk app HTML5 browser. Herein, only the URL is delivered so that the other device accesses the same webpage, and the screen is controlled individually. The present disclosure enables the caller or the callee to completely control the current webpage so as to achieve the same effect as virtual screen control. Either device sends various events such as a click event and a scroll event of the web browser to the other device via the dialweb client by entering a sharing control mode, and the dialweb client of the other device forwards the event to its browser. The present disclosure provides the HTML5 based web game merging function during the call.

Figures 14A, 14B:
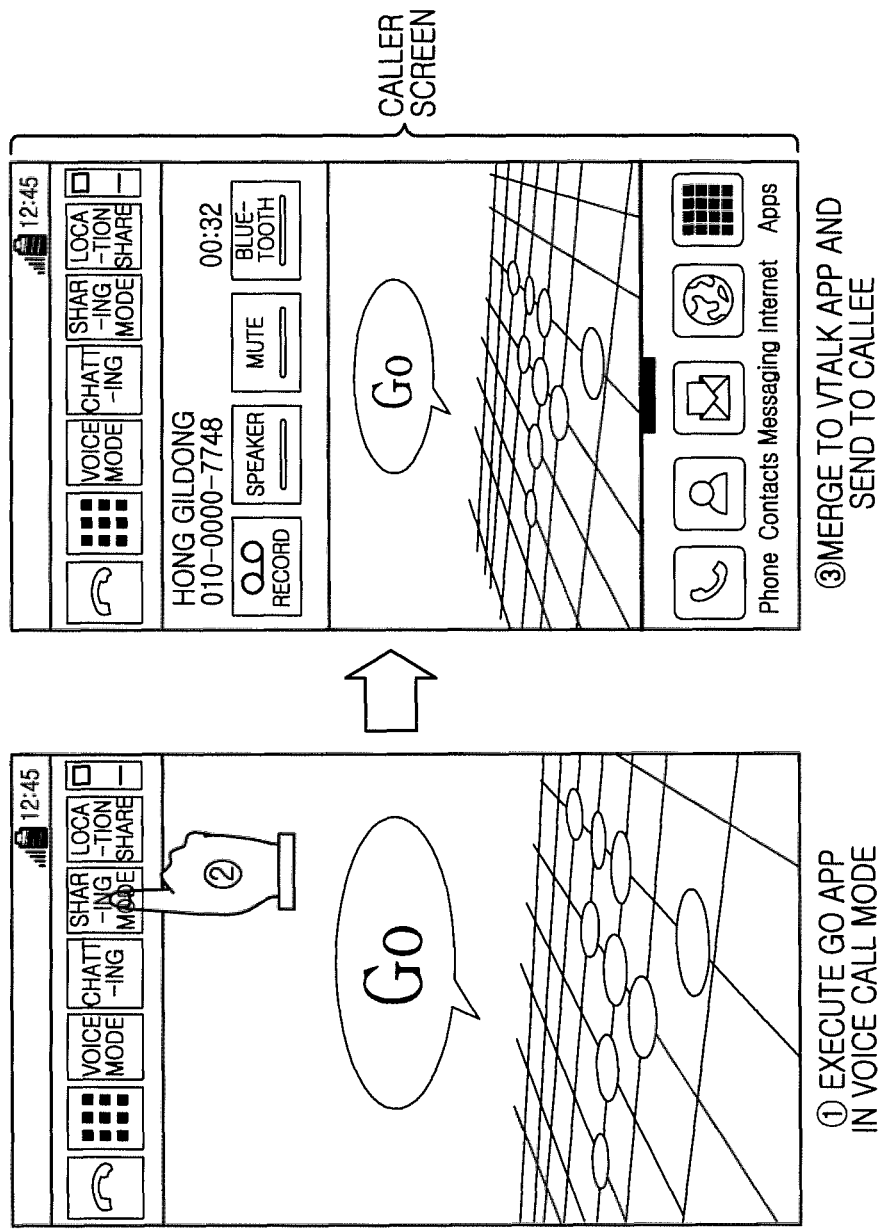

FIGS. 14A through 14D illustrate an example of a game program merging during the call according to this disclosure. For example, a go application is merged during the call. Such application merging is limited to the HTML5 based creation such as go application. FIGS. 14A and 14B show the caller screen, and FIGS. 14C and 14D show the callee screen. Referring to FIG. 14A, in the voice call mode of the Vtalk app, the HTML5 based go application installed to the UE is executed and the sharing mode is entered. In so doing, the Vtalk app reads the application information running right under the Vtalk app from the OS. When the application is the HTML5 based app, the Vtalk app merges and executes it in the current HTML5 browser and sends only the URL for executing the go application to the callee. In FIG. 14B, the go program is merged and executed in the web browser of the Vtalk app of the callee. FIG. 14C shows the callee screen, and FIG. 14D shows that the HTML5 based go application for the URL received from the caller is merged and executed together with the app.

The present disclosure provides a general app merging function during the call. To execute a program not created based on the HTML5 (such as a program downloaded from an app store), the user applies the game application sharing method of FIGS. 14A through 14D. In this case, the Vtalk app receives only the current application profile information from the OS and forwards it to the callee. When the callee installs the application according to the received profile information, the corresponding program is executed in the same manner as the go program execution using the web based device communication. The Vtalk app communicates with the OS in a way that the optimal app executor 130 of FIG. 3 reads information from the OS and the basic call app 110 obtains application name and version information using program registration information and sends the obtained information to the callee. The callee automatically processes a series of the application installation and execution using a macro executor defined by the optimal app executor 130 of FIG. 3. The present disclosure provides a Voice Mail System (VMS) and SNS rejection messaging function besides the SMS and the MMS.

Figure 15:
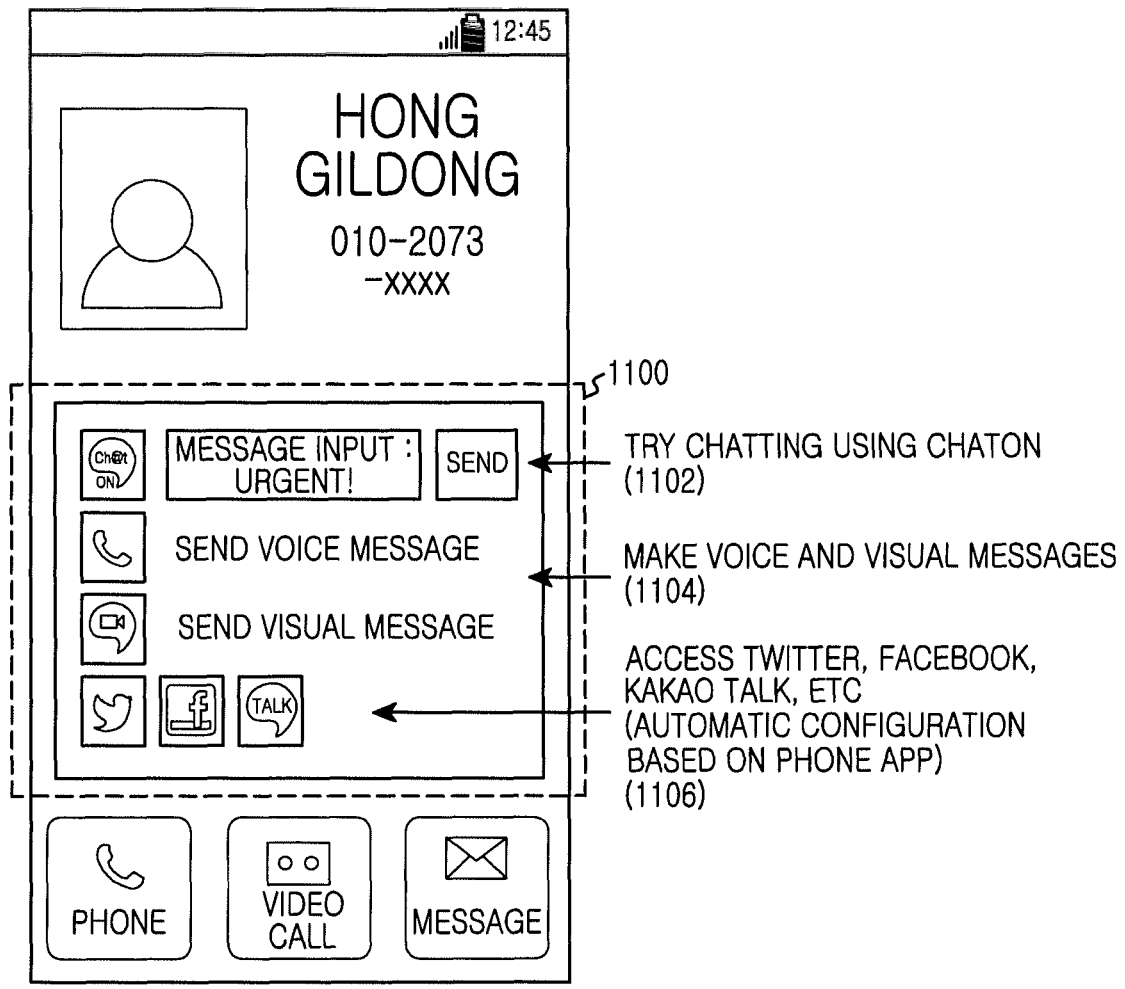
FIG. 15 illustrates an example rejection message transmission for a missed call according to this disclosure.

FIG. 15 illustrates an example rejection message transmission for a missed call according to this disclosure. Referring to FIG. 15, the Vtalk app provides an alternative path for sending a message 1100 to the other party in various manners with respect to the missed call. For example, the Vtalk app sends a text message 1102 in the basic call app, send a message 1106 using the SNS service opened by the callee for the caller's access, and send voice and visual messages 1104. In so doing, when the corresponding communication operator does not adopt a server for the IMS based voice message and a server for the visual message, the caller sends the message to the callee via the existing voice or visual message processing server through the IM-SSF for the IN interworking provided by the dialweb server.

Figure 16:
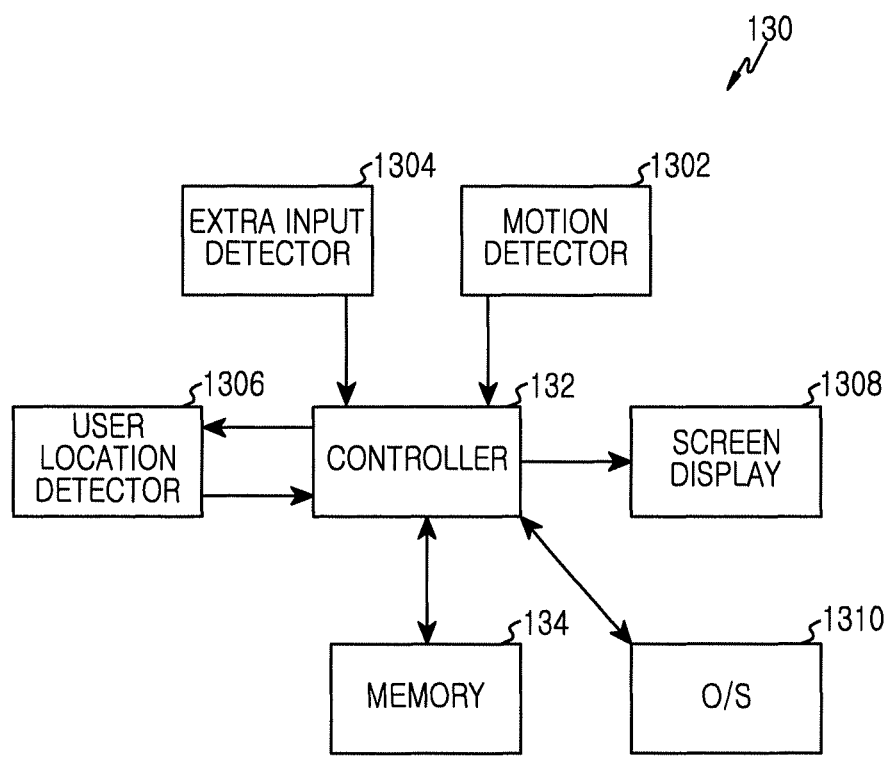
FIG. 16 illustrates an example optimal web executor according to this disclosure.

FIG. 16 illustrates an example optimal web executor according to this disclosure. For example, the optimal web executor is the optimal web executor 130 of FIG. 3. Referring to FIG. 16, the optimal web executor 130 includes the controller 132, the memory 134, a motion detector 1302, an extra input detector 1304, a user location detector 1306, a screen display 1308, and an OS 1310. The motion detector 1302 detects the UE shaking action of the user, and the controller 132 executes the Vtalk call app according to the detection of the motion detector 1302. In addition, according to the detection of the extra input detector 1304, the controller 1302 automatically executes a particular app when the user shakes the UE in case of emergency, and executes macro to be input after the corresponding app is executed. The controller 132 stores user location information detected by the user location detector 1306 by regular intervals in the memory 134 so that the macro uses the user location information in case of the event.

Figure 17:
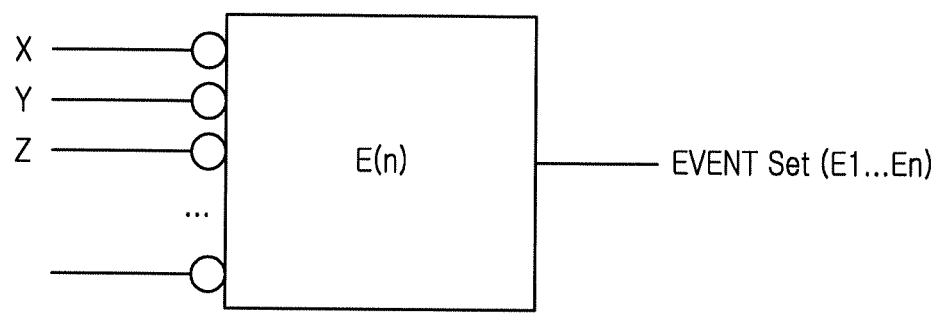
FIG. 17 illustrates example definitions of an event determinant and an event set according to this disclosure.
Figure 18:
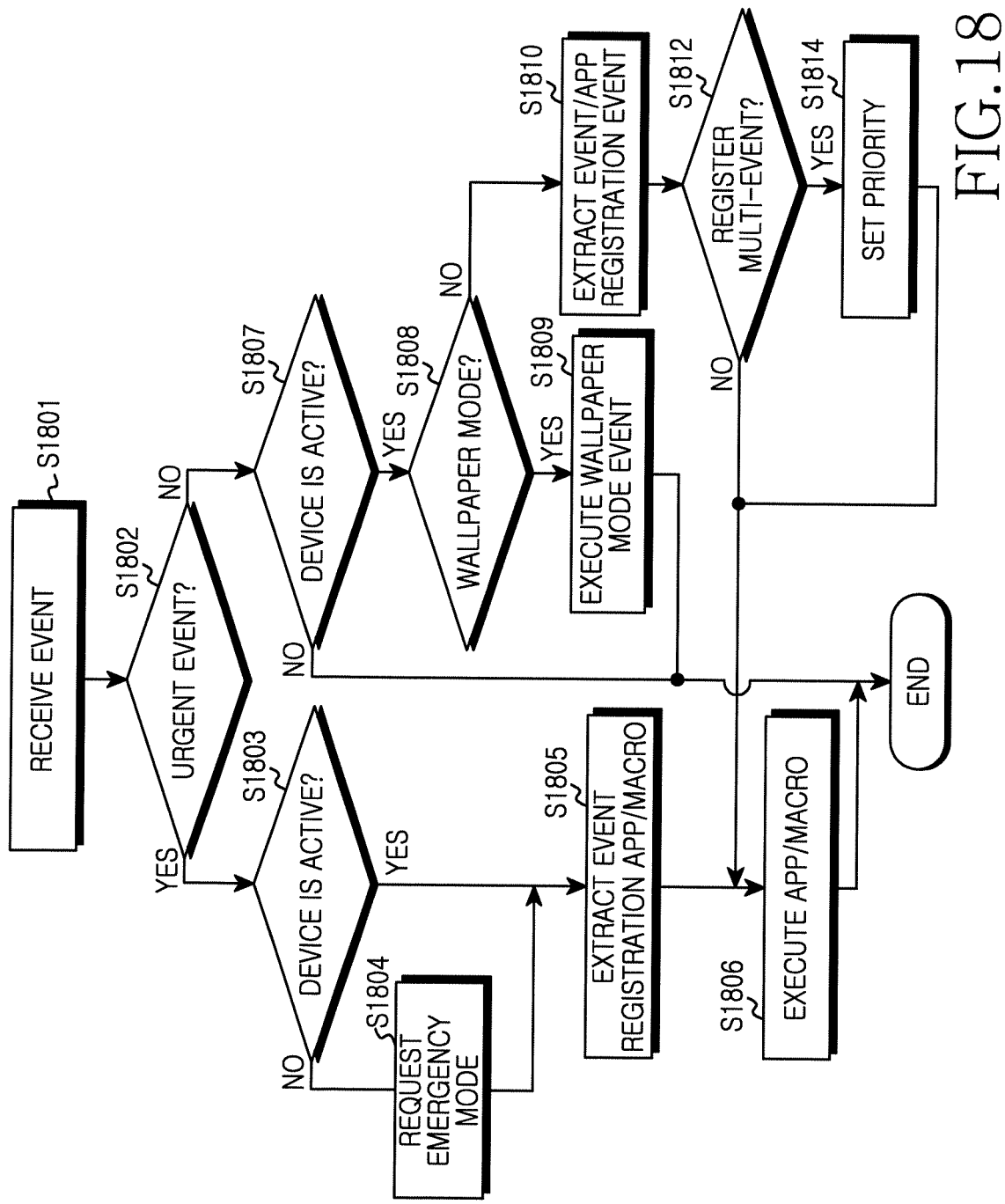
FIG. 18 illustrates an example method for executing an application in a controller of the optimal app executor according to this disclosure.

FIG. 17 illustrates example definitions of an event determinant and an event set according to this disclosure. Referring to FIG. 17, a plurality of event sets E1 through En are defined for a plurality of events X, Y, and Z. FIG. 18 illustrates an example method for executing an application in a controller of the optimal app executor according to this disclosure. This method is performed by the controller 132 of FIG. 16. Referring to FIG. 18, in S1801, the controller 132 receives the event. In S1802, the controller 132 determines whether the received event is an urgent event. When determining the urgent event, the controller 132 goes to S1803. Otherwise, the controller 132 goes to S1807.

In S1803, the controller 132 determines whether the device is active. When the device is not active, the controller 132 requests an emergency mode in S1804 and then proceeds to S51805. When the device is active, the controller 132 goes to S1805. The controller 132 extracts an event registration app and the macro in S1805 and executes the extracted app and the macro in S1806. In S1807, the controller 132 determines whether the device is active. When the device is not active, the controller 132 finishes this process. When the device is active, the controller 132 goes to S1808. In S1808, the controller 132 determines whether it is the wallpaper mode. In the wallpaper mode, the controller 132 executes the wallpaper mode in S1809. Out of the wallpaper mode, the controller 132 extracts the event/app registration event in S1810. In S1812, the controller 132 determines whether the extracted event is multi-event registration. When the extracted event is not the multi-event registration, the controller 132 goes to S1806. When the extracted event is not the multi-event registration, the controller 132 sets a priority in S1814 and then goes to S1806.

Figure 19:
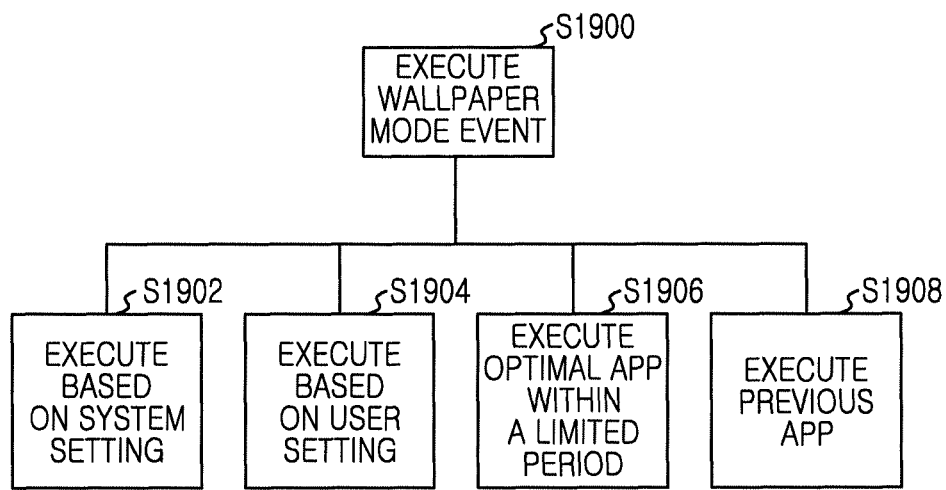
FIG. 19 illustrates an example method for executing a wallpaper mode event according to this disclosure.

FIG. 19 illustrates an example method for executing a wallpaper mode event according to this disclosure. Referring to FIG. 19, the wallpaper mode event execution S1900 includes executing based on system setting S1902, executing based on user setting S1904, and executing the optimal app within a limited period S1906, and executing the recent app S1908. As set forth above, the voice call service user (such as the VoLTE service user) chats with the other party beyond the conventional voice-centric communications, easily share the visual information for assisting the chatting with the other party, and enrich the communications by providing the other party with various private web contents and other web contents scattered and managed over the Internet through an appropriate security process before or during the call. While the conventional call exists only for the communications, the present dialweb service enables the access to various HTML5 based contents using the phone number. The merging of the basic call app of the Vtalk client and the general application uses various applications during the call and facilitate the access to the corresponding application and the situation notice in case of emergency.

The present operations is fulfilled by a single controller. In this case, program instructions realized by various computers is recorded in a computer-readable medium. The computer-readable medium includes, alone or in combination, the program instructions, data files, data structures, and the like. The program instructions is designed and constructed especially for the implementations of the present disclosure, or well known to those skilled in the art. Examples of computer-readable storage medium include magnetic media, such as hard disks, floppy disks, and magnetic tape; optical media such as Compact Disc (CD) Read Only Memory (ROM) disks and Digital Versatile Discs (DVDs); magneto-optical media, such as floptical disks; and hardware devices specially configured to store and execute the program instructions, such as ROM, Random Access Memory (RAM), flash memory, and the like. Examples of program instructions include machine code produced by a compiler, and high-level language code executed by the computer using an interpreter. When all or part of a base station or a relay is implemented as a computer program, the present disclosure includes the computer-readable recording medium storing the computer program.

While the disclosure has been shown and described with reference to certain exemplary embodiments thereof, it will be understood by those skilled in the art that various changes in form and details is made therein without departing from the spirit and scope of the disclosure as defined by the appended claims and their equivalents.

What is claimed is:

1. A method of a server in a communication system, the method comprising:
   receiving, from a first device, a call connection request to a second device;
   transmitting, to the second device, URL information of an application in case that the application is executed in the first device based on a hypertext markup language-5 (HTML5);
   transmitting, to the second device, profile information of the application in case that the application is not executed in the first device based on the HTML5;
   generating a first screen information for the first device, wherein the first screen information includes information of a user of the second device and content information related to the second device in response to the received call connection request;
   generating a second screen information for the second device, wherein the second screen information includes information of a user of the first device and content information related to the first device in response to the received call connection request;
   establishing a data communication connection between the first device and the second device;
   transmitting, to the first device, the first screen information to be displayed at the first device through the data communication connection;
   transmitting, to the second device, the second screen information to be displayed at the second device through the data communication connection;
   providing screen sharing service in order to display a same screen on the first device and the second device through the data communication connection during a call;
   receiving, from the first device, a control command related to the same screen through a control bearer; and
   transmitting, to the second device, the control command through the control bearer,
   wherein the second screen information of the second device is controlled based on an input related in the first screen information of the first device, and
   wherein the profile information includes install information of the application.

2. The method of claim 1, wherein generating the first screen information for the first device comprises:
   identifying the content information that can be provided to the first device is available to access, among a plurality of content information, and
   wherein the content information comprises web content information related to the second device.

3. The method of claim 2, wherein the web content information comprises at least one of an HTML5 based web content, link information on a web, and information stored in at least one of a social networking service (SNS) and an advertisement.

4. The method of claim 1, wherein establishing the data communication connection between the first device and the second device comprises:
   establishing a first hypertext transfer protocol (HTTP) session with the first device; and
   establishing a second HTTP session with the second device.

5. The method of claim 1, wherein the install information is configured to set up the application in the second device.

6. The method of claim 1, further comprising:
   receiving, from the first device, an input signal related to a name of the user of the second device; and
   transmitting, to the first device, user information for displaying in response to the receiving the input signal,
   wherein the user information includes location information and event information related to the user of the second device.

7. A method of a first device in a communication system, the method comprising:
   transmitting, to a server, a call connection request with a second device;
   establishing a data communication connection with the server;
   transmitting, to the server, URL information of an application in case that the application is executed in the first device based on a hypertext markup language-5 (HTML5);
   transmitting, to the server, profile information of the application in case that the application is not executed in the first device based on the HTML5;
   receiving, from the server, first screen information including information of a user of the second device and content information related to the second device;
   displaying the received first screen information;

establishing communication connection with the second device in response to transmitting the call connection request;

transmitting, to the server, a control command through a control bearer;

displaying second screen information based on at least one executed application in the first device; and transmitting a sharing data on the displayed second screen information to the second device through the data communication connection, wherein the second screen information of the second device is controlled based on an input related in the first screen information of the first device, and wherein the profile information includes information for installing the application in the second device.

8. The method of claim 7, wherein the establishing of the data communication connection with the server comprises:

establishing a hypertext transfer protocol (HTTP) session with the server.

9. The method of claim 7, further comprising:

displaying a screen for the communication connection with the second device and a screen to display the at least one executed application.

10. The method of claim 7, wherein displaying the second screen information based on an executed application comprises:

detecting a predetermined action of a user of the first device during the communication connection with the second device;

executing at least one application in response to detecting the predetermined action of the user; and displaying the second screen information based on the executed application.

11. The method of claim 7, wherein the information for installing the application is configured to set up the application in the second device.

12. The method of claim 7, further comprising:

transmitting, to the server, an input signal related to a name of the user of the second device; and receiving, from the server, user information for displaying, wherein the user information includes location information and event information related to the user of the second device.

13. An apparatus of a server in a communication system, the apparatus comprising:

a network interface; and at least one processor operatively coupled to the network interface, wherein the at least one processor is configured to control to:

receive from a first device, a call connection request for a second device, transmit, to the second device, URL information of an application in case that the application is executed in the first device based on a hypertext markup language-5 (HTML5), transmit, to the second device, profile information of the application in case that the application is not executed in the first device based on the HTML5, generate a first screen information for the first device, wherein the first screen information includes information of a user of the second device and content information related to the second device in response to the received call connection request, generate a second screen information for the second device, wherein the second screen information includes information of a user of the first device and content information related to the first device in response to the received call connection request, establish a data communication connection between the first device and the second device, transmit, to the first device, the first screen information to be displayed at the first device through the data communication connection, transmit, to the second device, the second screen information to be displayed at the second device through the data communication connection, provide screen sharing service in order to display a same screen information on the first device and the second device through the data communication connection during a call, receive, from the first device, a control command related to a same screen through control bearer, and transmit, to the second device, the control command through the control bearer, wherein the second screen information of the second device is controlled based on an input related in the first screen information of the first device, and wherein the profile information includes information for installing the application in the second device.

* * * * *